United States Patent [19]

Spiesberger

[11] Patent Number: 5,691,957

[45] Date of Patent: Nov. 25, 1997

[54] OCEAN ACOUSTIC TOMOGRAPHY

[75] Inventor: John L. Spiesberger, Port Matilda, Pa.

[73] Assignee: Woods Hole Oceanographic Institution, Woods Hole, Mass.

[21] Appl. No.: 792,701

[22] Filed: Jan. 29, 1997

Related U.S. Application Data

[63] Continuation of Ser. No. 424,630, Jun. 30, 1994, abandoned.
[51] Int. Cl.$^6$ ........................................................ G01V 1/00
[52] U.S. Cl. ................... 367/3; 367/5; 367/6; 73/170.29
[58] Field of Search ..................... 367/3, 5, 6; 73/170.29

[56] References Cited

U.S. PATENT DOCUMENTS

| | | | |
|---|---|---|---|
| 4,114,135 | 9/1978 | Funk | 367/6 |
| 4,446,542 | 5/1984 | Beckerle | 367/131 |
| 4,805,160 | 2/1989 | Ishii et al. | 367/134 |
| 5,119,341 | 6/1992 | Youngberg | 367/5 |

OTHER PUBLICATIONS

John L. Spiesberger, et al "Understanding Global Climate Change With Ocean Acoustic Tomography And Models", International Information Forum, State Kremlin Place Moscow, Nov. 23–29, 1992.

John L. Spiesberger, "Listening For Climate Temperature Change In The Ocean", Oceanology International 92 Exhibition and Conference, Brighton, England, Mar. 10–13, 1992.

John L. Spiesberger and James B. Bowlin, "A Telemetry Scheme For Ocean Acoustic Tomography: Real Time Monitoring", Journal of Marine Environmental Engineering, vol. 1, pp. 1–22, 1993.

John L. Spiesberger, "Is It Cheaper To Map Rossby Waves In The Global Ocean Than In The Global Atmosphere?", Journal of Marine Environmental Engineering, vol. 1, pp. 83–90, 1993.

John L. Spiesberger, et al, "Global Acoustic Mapping Of Ocean Temperatures (GAMOT)", IEEE Oceans '93 Proceedings, pp. I–253–I–257, 1993.

John L. Spiesberger, "Inland Oceanography?", Earth And Mineral Sciences, vol. 62, No. 3, pp. 51–55, Penn State College.

Daniel E. Frye, et al "Surface Suspended Acoustic Receiver (SSAR) For Mapping Ocean Temperatures", Woods Hole Oceanographic Institution.

Lee Freitag, et al, "Surface Suspended Acoustic Receiver", Sea Technology, Feb. 1995, pp. 43–48.

*Primary Examiner*—J. Woodrow Eldred
*Attorney, Agent, or Firm*—Norman E. Brunell

[57] ABSTRACT

An acoustic tomography telemetry system and method allowing spatially averaged ocean temperatures to be measured in real-time. The system includes autonomous acoustic sources mounted on subsurface moorings and receivers that are either suspended from drifting surface buoys or cabled to shore. The telemetry method largely eliminates, in real-time, corruption of acoustic travel times due to wander of the source's mooring by shifting the start times of tomographic transmissions. Corrections to source wander are obtained without expending battery energy over and above that used in conventional tomography experiments. Standard techniques are used to correct clock errors at the source in real-time.

20 Claims, 7 Drawing Sheets

OCEAN ACOUSTIC TOMOGRAPHY

This is a continuation of application Ser. No. 08/424,630 filed on Jun. 30, 1994, now abandoned.

This invention was made, in part, during research supported by the Office of Naval Technology under contract N00014-90-C-0098, from which the government of the United States obtains certain rights to this invention.

BACKGROUND OF THE INVENTION

1. Field Of The Invention

This invention relates to a method and system for real-time monitoring of changes in ocean temperature over ocean basin distances, for example, from Hawaii to California within a time scale of one hour.

2. Description Of The Related Art

In 1979, W. Munk and C. Wunsch suggest in the article "Ocean acoustic tomography: a scheme for large scale monitoring", *Deep-Sea Research*, 26, 123–161, that ocean temperatures might be mapped by measuring travel times along acoustic multipaths, but conjectured that the technique would be limited to distances of 1000 kilometers (km) due to scattering of the acoustic field from internal waves. In their method of acoustic tomography, differences between measured travel times and predicted times derived from archival data are used to correct the reference field, using techniques similar to those employed by seismologists mapping the Earth's interior structure from sounds emitted by earthquakes. To test the method, a mapping experiment was conducted in 1981 over ranges of a few hundred kilometers. The storms of the oceans, eddies of about 100 km horizontal scale, were mapped using criss-crossing sound paths between many sources and receivers arranged on the perimeter of a rectangular region. The experiment was a success, proving the feasibility of the technique.

Our research group was eager to extend the range of acoustic signals and became interested in the idea of using basin-scale measurements to detect global warming trends. The idea was that if the Pacific warmed, the speed of sound would increase and the travel time would decrease. Basin-scale sound transmission is appropriate for detecting global warming because this is the scale over which temperatures are predicted to fluctuate from models. Most global warming models predict some ocean basins will warm, while others will cool.

In 1983, using conventional equipment, we began transmitting sounds with an intensity similar to the level of the calls of some whales across a 4000 km path through the Pacific Ocean. The 133 Hz signals were transmitted from a source cabled to shore from 180 meters (m) depth off Kaneohe Bay, Oahu, and were detected by a U.S. Navy Sound Surveillance System (SOSUS) station off the California coast. We showed that the travel time of sound across the Pacific could be converted into the change in the spatially averaged temperature between the two instruments. This kind of large-scale measurement had never been made before. Previous measurements of ocean temperature came from piecing together data taken from ships at points. There is much variability in temperature at small scales in the ocean. Thus it is difficult to see changes at large scales from point data. This small-scale variability s suppressed in basin-scale acoustic thermometry because the acoustic paths travel through many plus/minus variations in temperature which, when summed, amount to little.

In six years of intermittent tests, we found that the travel times across the Hawaii/U.S. Pacific basin varied by about ±0.2 seconds (s), corresponding to ±0.1° C. The measurements had an accuracy to within 0.02° C. This thermal variability is not a global warming signal but is probably generic to oceans. We found that the temperature variations in the Pacific had spatial structures smaller than 500 km and were unable to resolve the structure using SOSUS stations and existing cabled sources. It was apparent that new types of instrumentation would be required to provide a satisfactory understanding of this natural variability, and we turned to new technology using autonomous instrumentation. Thus, these measurements, obtained between 1983 and 1989, showed that travel times varied by about ±0.2 s at interannual time scales along basin-scale sections in the northeast Pacific. These are equivalent to spatially averaged changes of ±0.1° C. in the upper kilometer of ocean. Interannual variations can be resolved if travel times are measured to within 0.02 s; some ten times less than the measured variations.

One conventional tomographic scheme involves transmitting sound from autonomous subsurface moored sources to bottom-mounted receivers. Each source mooring includes batteries, clocks, computers and a local navigation system, and costs about $350,000. The source's clock errors amount to about 0.1 s per year. Travel times are normally corrected for these errors after the experiment. For real-time operation, corrections must be made for the source position which moves about ±300 m on the mooring, so that acoustic arrival times change accordingly by about ±0.2 s. Arrival times are conventionally corrected for wander during post-experiment analysis using navigation data stored in the source throughout the experiment. Corrections for mooring wander can be made in real-time if the mooring is attached to a surface unit which communicates to satellites. However, the surface unit may cost about $100,000 and the surface connection is subject to the action of waves and may fail. A reliable source is desirable because it is usually the most expensive component of an acoustic tomography system. In this application, real-time signifies that the acoustic data are transmitted into the laboratory one day following their measurement.

Real-time monitoring can be accomplished conventionally by cabling sources and receivers to shore. If the instruments are on the bottom, they do not move and there are no timing problems. Unfortunately, there are not enough sources and receivers for monitoring all oceans with sufficient resolution. Cabling a new source or a new receiver to shore is estimated to cost more than a million dollars. It is too expensive to cable enough sources and receivers to shore for monitoring ocean basins at the important climatic scales exceeding a few hundred kilometers.

T. G. Birdsall, "Acoustic telemetry for ocean acoustic tomography", *Institute of Electrical and Electronics Engineers Journal of Oceanic Engineering*, 9, 237–241 (1984) and H. M. Kwon and Birdsall, "Digital waveform codings for ocean acoustic telemetry", *Institute of Electrical and Electronics Engineers Journal of Oceanic Engineering*, 16, 56–65 (1991) have suggested that the local x-y-z coordinates of the source can be telemetered to fixed or moored receivers by transmitting M-sequence signals, one right after the other. Each coordinate can be digitized to eight bits and transmitted as one of $2^8$ =256 different signals chosen from 16 different 255-digit M-sequences, each one of which is circularly rotated in time to 16 different start positions to make 16×16=256 different signals. Birdsall suggested transmitting the coordinate information at a reduced power level so as not to use additional battery energy over and above that ordinarily used for a tomography transmission. However, if additional battery energy is not used, the probability of detecting the telemetry transmissions is significantly decreased because the acoustic source level is decreased. The battery packs must contain between three to four times more energy if the source level is not to be reduced for telemetry transmissions. Also, significant computations are required at the receivers to estimate which M-sequence was transmitted. While this is not a significant drawback for receivers cabled to shore, it is a difficulty for autonomous receivers where the computations may require significant battery energy.

SUMMARY OF THE INVENTION

In contrast to conventional approaches, the present invention is implemented at the full source level and requires no additional battery energy over and above that conventionally used for tomographic transmissions, and requires only trivial computations for estimating travel time changes due to position changes of the source. Moreover, the present invention has the potential for monitoring basin-scales in real-time at a fraction of the cost for monitoring with cabled systems.

In the present invention, a subsurface mooring with an anchor on the ocean floor and a subsurface float at about 400 m depth, designed to keep the mooring taut in the currents includes an acoustic source with batteries and controlling computers housed at about 500 m. Previously, the position of the source as it swung back and forth in the currents was estimated by measuring the two-way travel times between an acoustic pinger near the source and the known positions of acoustic transponders mounted nearby on the ocean floor. At the end of an experiment, the mooring would be brought to the surface for processing and analysis of the data. The present mooring telemeters its variable position to a plurality of Surface Suspended Acoustic Receivers (SSAR's).

The SSAR is a free-drifting acoustic receiver which combines a multi-element hydrophone array suspended in the ocean's sound channel with in situ data processing, acoustic and satellite navigation, and near real-time data telemetry. The SSAR includes a small surface buoy made of foam which supports a surface electronics package and provides a platform for satellite antennas. An aluminum pressure case houses the electronics and is used as a central strength member in the buoy. A compliant hose is attached beneath the surface buoy and buoyancy is split between the surface buoy and a subsurface buoy located at the bottom end of the hose section. Below the hose section is 500 m of three-conductor electro-mechanical cable. The cable is a two-layer steel armor construction with an outer polyurethane jacket. The cable terminates at a lower pressure case which contains an acoustic array receiver, an analog-to-digital (A/D) board, a processor, and related sensors and batteries. Suspended from the lower case is a six-element hydrophone tomography array, 50 m in length. A lead weight is suspended beneath the array to help maintain a vertical orientation. The six elements of the low-frequency hydrophone array are wired to an analog front-end and digitizing subsystem. At the midpoint of the array is a two-axis tilt sensor which allows the approximate arrival angles of the acoustic multipaths observed at the array to be calculated. The array will tilt depending on the local current shear. The primary SSAR electronic subsystems are a tomography receiver, buoy and array navigation systems, and control, power and telemetry modules.

An ultra-short baseline (USBL) acoustic positioning system in the bottom package tracks the position of the acoustic array with respect to the surface buoy. The USBL system measures the x-y offset and range from the surface buoy and does so at a time synchronized with the Global Positioning System (GPS). To determine where the tomography array is with respect to the surface buoy, an acoustic responder at the buoy is triggered by command from below to transmit a coded ping to a USBL high-frequency hydrophone array mounted just above the pressure case located at the bottom of the cable. The output of the USBL is azimuth, elevation and acoustic travel time. To determine the attitude of the high frequency array, a two-axis tilt sensor is used, and rotation is measured by a digital flux-gate compass. Temperature and pressure sensors are used to make sound speed and depth estimates, respectively. The sensor data are combined with the acoustic data to transform coordinate systems and optimally estimate the x-y-z offset.

Identical control computers are used at the surface and bottom. Key features include low power sleep mode and real-time clock wake-up. The control computer at the surface has to manage a GPS receiver and an ARGOS communications satellite system transmitter, as well as telemetry to the bottom package. Alkaline battery packs are located in the top and bottom pressure cases.

The acoustic source(s) transmit once or more per transmission day. The SSAR will listen to each source on a different day. Before a source is due to transmit, the system comes out of low-power state and turns on the GPS receiver. Using the current time and position from the GPS receiver the estimated travel time from the source is computed using a data base of average sound speed. This time, approximately 30 minutes for a basin-scale path, is used to set the time for the tomography collection to begin. Precise time is transferred over the communication cable to the bottom electronics package using the one pulse per second output from the GPS receiver. The bottom system then knows exactly when to begin collecting acoustic data, and that time is saved with the output data and sent back to a shore station via ARGOS. After the position fix is obtained, the tomography system begins collecting data from the array. A tomography digitizer samples the receiver output at 300 Hz per channel and loads the data into the control computer for later processing by a digital signal processor (DSP). The digitizer is isolated as much as possible to reduce coupling of electrical noise into the low-amplitude acoustic signals. The data are directly transferred to processor memory and then to a non-volatile SRAM disk. When the reception is complete, the analog system is turned off and the DSP activated. The tomography data are beam-formed, match-filtered and processed for Doppler shift by the DSP. Peaks are picked from the processed data and their arrival time, signal-to-noise ratio and arrival angle recorded. This output is compressed to an absolute minimum and stored for later transmission back to shore via ARGOS. After these tasks are completed, the source schedule is consulted to obtain the next data collection time and the system returns to low-power mode.

The source knows its position in real-time from a local navigation system, and can shift its transmission time so that data from the receivers can be used to correct measured travel times for source wander. No information is lost using the telemetry scheme since the shifts in transmission time can be undone when the experiment is finished and analysis made.

In accordance with one aspect, the present invention provides a method for collecting data in a large body of water such as the ocean by deriving an offset time interval related to source data to be transmitted, transmitting an acoustic signal from an acoustic source delayed from a preselected transmission time by the offset time interval, determining a measured arrival time at which the acoustic signal is received at a receiver, the travel time of the acoustic signal between the source and the receiver being distinguishably larger than the offset time interval and deriving the source data from the measured arrival time. The offset time interval may be related to a position offset between the acoustic source and a known anchor point.

In accordance with another aspect, the present invention provides a method for collecting ocean data by determining a three dimensional position offset between a tethered acoustic source and an anchor point for the source, deriving an offset time interval related to the three dimensional position offset, transmitting an acoustic signal from an acoustic source, the time of transmission of the acoustic signal being delayed from a preselected transmission time by the offset time interval, determining a measured arrival time of the acoustic signal at a free-floating buoy, the travel time of the acoustic signal between the tethered acoustic source and the free-floating buoy being distinguishably larger than the offset time interval, and deriving data from the measured arrival time. The data may be derived by determining a difference between an estimated time of arrival of the acoustic signal at the free-floating buoy based on a transmission at the standard time of transmission and the measured arrival time and further by determining actual travel time of the acoustic signal between the source and the buoy by subtracting the offset interval from the measured arrival time.

These and other features and advantages of this invention will become further apparent from the detailed description and accompanying figures that follow. In the figures and description, numerals indicate the various features of the invention, like numerals referring to like features throughout both the drawings and the description.

BRIEF DESCRIPTION OF THE DRAWINGS

PIG. 6a shows a block diagram of a Standard SSAR.

DETAILED DESCRIPTION OF THE PREFERRED EMBODIMENT

The present invention describes a telemetry scheme in which a moored source transmits new information to the acoustic receivers. This information is sufficient to estimate acoustic travel times to within 0.02 s even if the source wanders hundreds of meters.

The navigational accuracy required to measure climatic temperature signals in the ocean using a SSAR suspended from the surface is estimated.

As discussed by J. L. Spiesberger et al. in "Stability and identification of acoustic multipaths", *Journal of the Acoustical society of America*, 92, 384–396 (1980), it is common practice to transmit tomographic signals many times per day in order to increase the probability of detecting every multipath, any one of which may vanish for a particular transmission due to scintillation. These multiple transmissions currently produce some redundant information at the receivers. This redundancy is used to correct for source wander in real-time.

Figure 1:
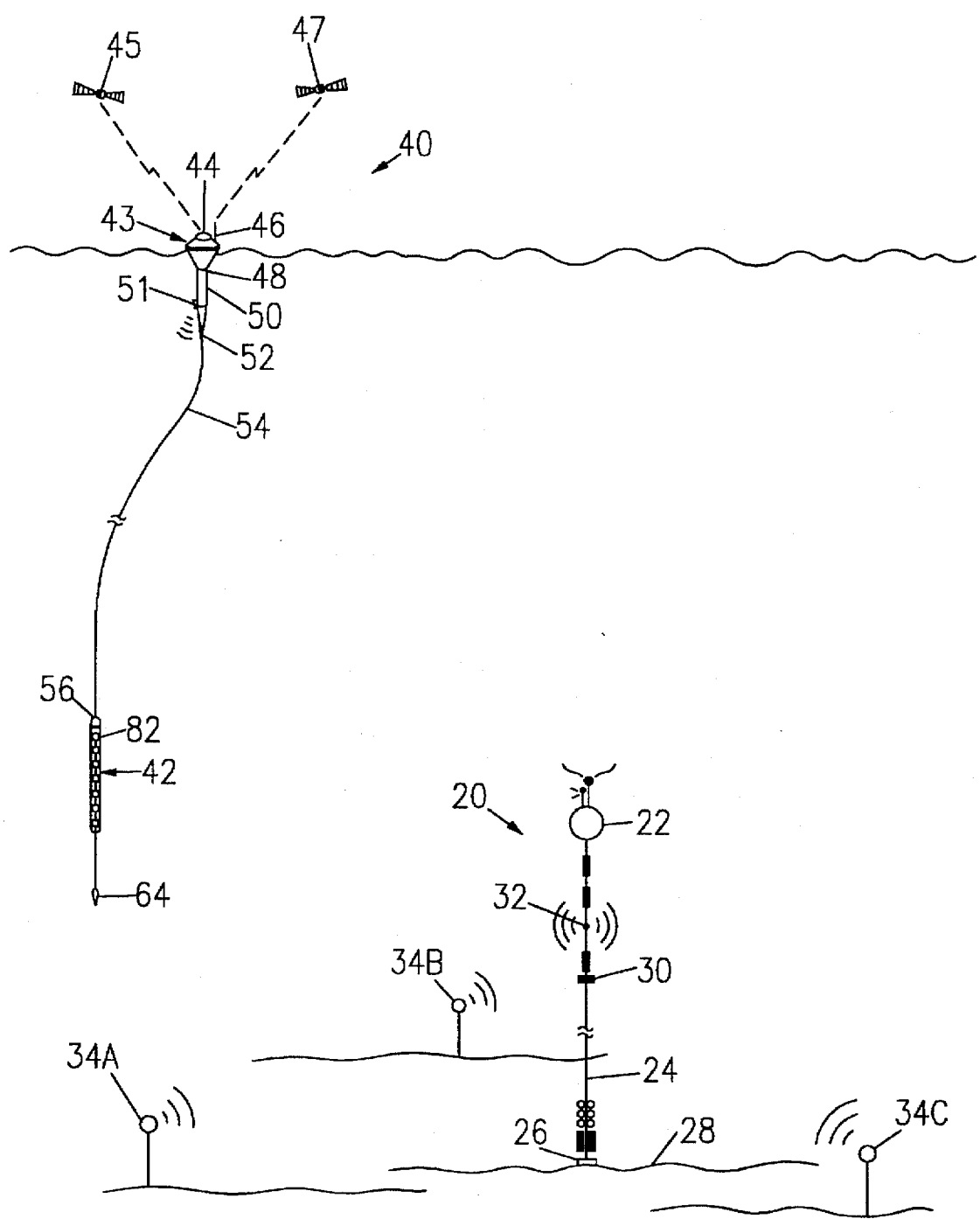
FIG. 1 is a block diagram of an autonomous tomography mooring including an acoustic source, an interrogator, and a subsurface buoy; and a Surface Suspended Acoustic Receiver including a surface buoy on which are mounted a GPS receiving antenna and an ARGOS transmitting antenna, a subsurface tomographic hydrophone array, an ultra-short baseline hydrophone array, and upper and lower instrument pressure cases.

As shown pictorially in FIG. 1, an acoustic tomography system 10 includes a source mooring 20 having a subsurface buoy 22 attached to a cable 24 moored by an anchor 26 to the ocean floor 28. An acoustic source 30 attached to cable 24 is disposed below the buoy 22 so that the source is within the sound channel. An interrogator 32 is attached to cable 24 near the source 30. Define two coordinate systems: one a local Cartesian system near the source, and the other a local Cartesian system near the receiver. The local Cartesian systems are defined by x and y axes in the horizontal plane with the x axes parallel to each other. The origin of the Cartesian system near the source is chosen to be near the average position of the source. The distance between the source and any receiver is assumed to be much greater than the distance between the source and the origin.

The geographic reference position of the origin, is memorized by the source before the operation. This is accomplished as follows. As shown in FIG. 1, three bottom transponders 34A, 34B, and 34⊘ are located about 5 km from the bottom anchor of the source's mooring. Their geographic coordinates are determined to within about 10 m accuracy using standard acoustic surveys from a ship equipped with GPS navigation. The source can be informed about the geographic coordinates of the bottom transponders using a short baseline acoustic modem.

Figure 8:
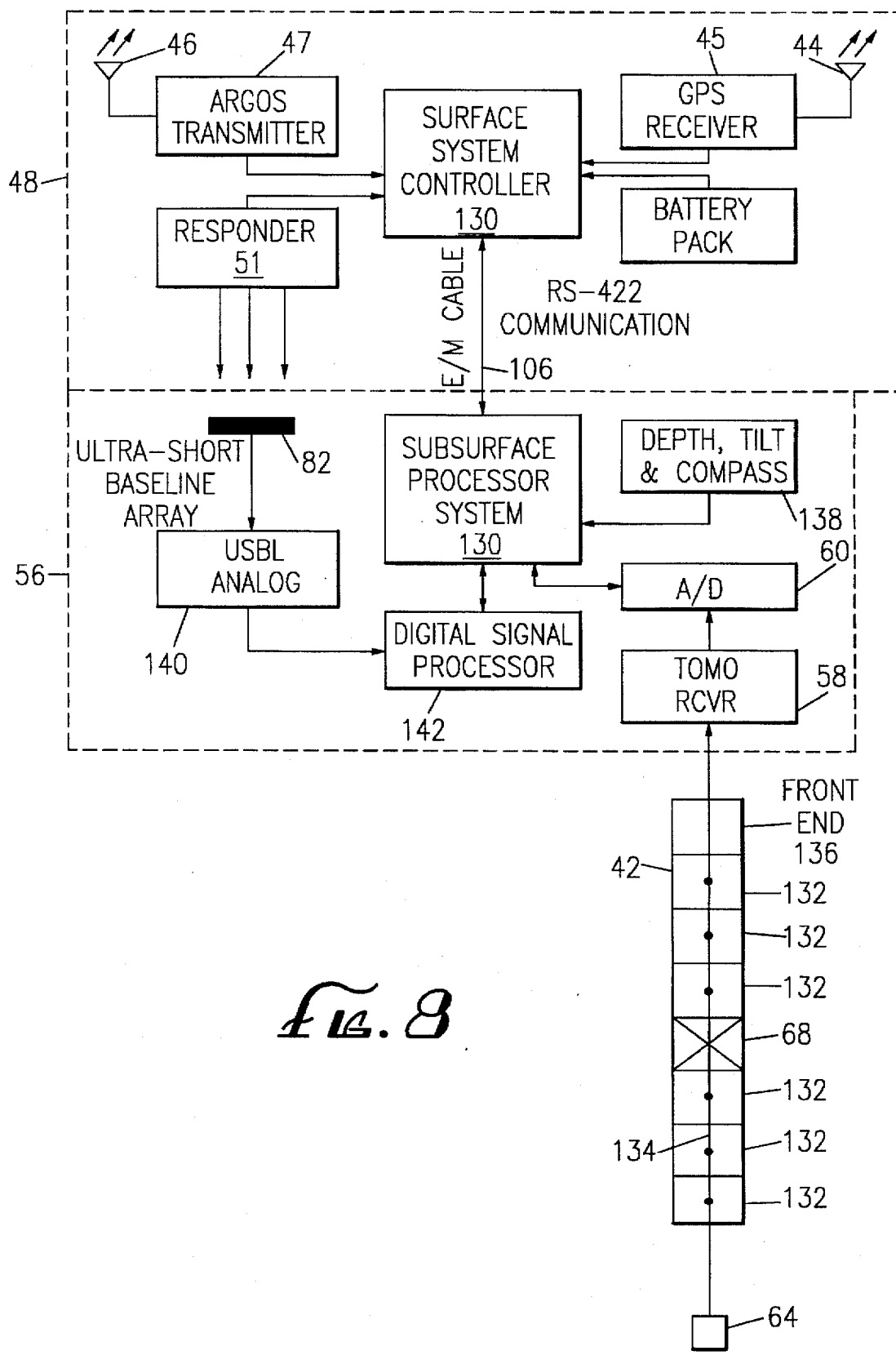
FIG. 8 is a block diagram of SSAR data collection, processing and telemetry systems.

Still referring to FIG. 1, an SSAR 40 includes a tomography six-element hydrophone array 42 suspended in the ocean's sound channel. The SSAR 40 further includes a small surface buoy 43 made of foam which provides a platform for an antenna 44 to receive signals for GPS receiver 45, and an antenna 46 to transmit data via ARGOS transmitter 47. An aluminum pressure case 48 houses instrumentation electronics and is used as a central strength member in buoy 43. A compliant hose 50 is attached beneath buoy 43 and buoyancy is split between buoy 43 and a subsurface buoy 52 located at the bottom end of hose 50. An acoustic responder 51 is mounted on hose 50. Below hose 50 is a three-conductor electro-mechanical cable 54, 500 m in length. Cable 54 is constructed from two-layer steel armor with an outer polyurethane jacket. Cable 54 terminates at a lower pressure case 56, described below in greater detail with respect to FIG. 8. Suspended from case 56 is the tomography array 42, 50 m in length. A lead weight 64 is suspended beneath array 42 to help maintain a vertical orientation. An ultra-short baseline (USBL) acoustic positioning system 82 in cooperation with acoustic responder 51, tracks the position of the acoustic array 42 with respect to surface buoy 43. USBL system 82 measures the x-y offset and range from acoustic responder 51 on buoy 43 and does so at a time synchronized with the GPS system.

Suppose there are two receivers, one along the bearing of the x axis and one along the bearing of the y axis. The source calculates its position relative to the origin, then computes its projected distance along the x axis. The source then computes the local speed of sound and shifts its first transmission time so the receiver along the bearing of the x axis receives multipaths as through the source was at the origin. A tomographic map can now be made in real time from data obtained at this receiver. For the second transmission, the source calculates its projected distance along the y axis and shifts its transmission time so the receiver along the bearing of the y axis receives multipath as though the source was again at the origin. A tomographic map can now be made in real time from data obtained from this receiver. For the third transmission, no shift is made in transmission time. Assuming the ocean changes slowly enough so that changes in travel time between the source and each receiver are dominated by wander of the source, then the x coordinate of the source can be estimated during the third transmission from the difference in arrival times between the first and third transmissions measured from the receiver along the bearing of the x axis. Similarly, the y coordinate of the source can be estimated during the third transmission from the difference in arrival times between the second and third transmissions using the receiver along the bearing of the y axis.

In this example, the x and y coordinates of the source on the first and second transmissions were not estimated in real time even though tomography was done in real time. It is possible to do tomography in real time without knowing the position of the source in real time, but this is an exceptional circumstance. As described below in greater detail, the position of the source can be estimated in real time and tomography can be done in real time if there are three or more receivers and three or more transmissions. For this last case, the time-shifting of the transmissions is like a code which can be deciphered at the receivers to estimate the position of the source.

The principles given above are formalized for a single source and a group of receivers. The standard forward problem for ocean acoustic tomography is modified by shifting the nominal start time of a transmission. The effects of the currents are ignored for simplicity. For transmission i and receiver j, the measured arrival time for any multipath is, $$T1_{ij} = \left( \frac{1}{c(o)} \vec{s_i} O \vec{P_i} + \frac{1}{c(o)} \vec{es_i} O \vec{P_i} \right) + \int_{\vec{s_i}}^{\vec{r_{ij}} + \vec{\delta r_{ij}}} \frac{dl}{c + \delta c} + eT1_{ij} \quad (1)$$

Arrival time is the elapsed time between the nominal and unshifted start time of zero and the arrival of the multipath at the receiver. The origin of the coordinate system used in equation (1), $\vec{0}$, is at a defined geographic location and at a defined depth near the source. The position of the source in this frame is, $$\vec{S_i} = \vec{s} + \vec{s_i} \quad (2)$$

where $\bar{s_i}$ is the geographic position and depth of the source in the reference frame of the local navigation system. The reference frame of the local navigation system is ideally at the origin, $\vec{0}$. However, the origin of the local navigation system differs from the defined origin, $\vec{0}$ by $\vec{s}$ because of errors from the navigational survey of the bottom transponders. $\vec{s}$ does not depend on time and the local navigation system has no information about this offset. In "Inverse methods and results from the 1981 ocean acoustic tomography experiment", Ph.D. dissertation, MIT and WHOI (1983) and "Simulations of acoustic tomography array performance with untracked or drifting sources and receivers" *Journal of Geophysical Research*, 90 9079–9088 (1985), B. D. Cornuelle suggested using tomographic techniques to estimate this offset. The actual position of the jth receiver is $\bar{r}_{ij} + \delta \bar{r}_{ij}$, the measured position of the jth receiver is $\bar{r}_{ij}$, and the error in the measured position is $\delta \bar{r}_{ij}$. The receiver can be either stationary or mobile. The differential element along the multipath is dl. The reference field of the sound speed is c and the actual sound speed field is c+δc. The measured error in arrival time due to noise is $eT11_{ij}$. The shift time for the ith transmission is in the parentheses. The vector $\vec{P_i}$ governs the magnitude of the shift and the open circle denotes the dot product. If $\vec{P_i} = \vec{0}$, then the transmission is unshifted. If $|\vec{P_i}| = 1$, then transmission time is corrected for a receiver whose local bearing angle from the source is in the $\vec{P_i}$ direction. For example, $\vec{P_i} = (0,1)$ corrects transmission times for receivers whose bearing angles are locally along the positive y axis. The shift in transmission time is imperfect because the source cannot estimate its position perfectly, so the error in transmission time is given by $(1/c(\vec{0}))e\vec{s}$, O $\vec{P_i}$. The values of $\vec{P_i}$ that can be memorized by the source before the experiment begins are selected below.

The reference arrival time for any multipath, $$To_{ij} = \int_{\vec{s}}^{\vec{r_{ij}}} \frac{dl}{c} \quad (3)$$

is defined to be the computed time between the origin and the measured position of the receiver through the reference sound speed field. The difference between the reference and measured travel time is:

$$\delta T_{ij} = T1_{ij} - T0_{ij} \quad (4)$$

This difference is expanded to first order in the quantities $\delta \bar{r}_{ij}$, δc, and $\bar{S}_i$ to obtain $$\delta T_{ij} = \Omega_j + \frac{1}{c(0)} \vec{s_i} O (\vec{P_i} - \hat{u}_{ij}) + \quad (5)$$

$$rerr_{ij} + \delta T_{ij} + \epsilon_{ij} + eT1_{ij} + \frac{1}{c(0)} \vec{es_i} O (\vec{P_i} - \hat{u}_{ij})$$

where, $$\Omega_j \equiv -\frac{1}{T} \sum_{i=1}^{I} \int_0^{\vec{r_{ij}}} \frac{\delta c \, dl}{c^2} \quad (6)$$

$$rerr_{ij} \equiv \frac{\vec{\delta r_{ij}} O \hat{v}_{ij}}{c(r_{ij})} \cos \beta_{ij} \quad (7)$$

-continued $$\delta \tau_{ij} = -\int_O^{\vec{r}_{ij}} \frac{\delta c \, dl}{c^2} - \Omega_j \quad (8)$$

$$\epsilon_{ij} \equiv \frac{\vec{s}_i O \hat{u}_{ij}}{c(O)} (1 - \cos\theta_{ij}) - \frac{\vec{s}_i O \hat{K}}{c(O)} \sin\theta_{ij} + \quad (9)$$

$$\frac{\vec{s}_i O \hat{u}_{ij}}{c(O)} (1 - \cos\theta_{ij}) - \frac{s O \hat{K}}{c(O)} \sin\theta_{ij} + \frac{\vec{\delta r}_{ij} O \hat{K}}{c(\vec{r}_{ij})} \sin\beta_{ij}$$

Equation (5) is the standard linearized forward problem for ocean acoustic tomography derived by Cornuelle (supra) except for the new terms involving the shift vector $\vec{P}_j$. The local unit bearing vectors of the geodesic at the origin and at receiver j are denoted by $\hat{u}_{ij}$ and $\hat{v}_{ij}$, respectively, where these vectors point away from the origin. The local unit vector pointing up is $\hat{k}$. The inclination angles of vectors tangent to the multipath at the source and at the receiver are given by $\theta_y$ and $\beta_{ij}$, respectively. The angles are measured positive up from the horizontal where the tangent vector points away from the origin. The term, $\epsilon_{ij}$, is a sum of inclination terms. Changes in travel time due to errors in the measured horizontal position of the receiver are given by rerr$_{ij}$. The average travel time perturbation over I transmissions between the origin and the measured position of the receiver is "$\Omega$", which is called the ocean travel time (OTT). Typically, "$\Omega$", is a strong function of changes in the speed of sound and a weak function of changes in the position of the receiver when the change in distance to the receiver is small during I transmissions. Fluctuations in travel time about "$\Omega$", due to sound speed perturbations are denoted by $\delta\tau_{ij}$. The time interval between transmission one and I is taken to be short enough so that the changes in travel time due to sound speed perturbations, $\delta\tau_{ij}$ are dominated by the effects of Integral waves and tides rather than other oceanographic processes.

Equation (5) is written for each multipath separately, so if there are I transmission, J receivers, and K multipaths between each source and receiver, there are actually IJK equations in equation (5). Inverse solutions for the positions of the source and receivers and for $\delta c$ can be formulated using standard tomographic techniques.

Setting the shift vector, $\vec{P}_j$ to $\hat{u}_{ij}$ is a robust technique for removing about 99.5% of the travel time change due to wander of the source at receiver j. The remaining 0.5% is due to the small effects of the inclination terms, $\epsilon_{ij}$ which contribute about 0.001 s of a total of about 0.2 s due to wander of the source (Table I). This procedure is robust in the context of data dropouts due to multipath scintillation because each of the non-faded multipaths will be recognized to be shifted by the same amount due to the shift in transmission time. Conversely, it is challenging to estimate the wander of the source from the inclination terms alone because the inclination terms are about two orders of magnitude smaller than the travel time changes due to either source wander or due to sound speed changes which might be partially confused with source wander (Table I).

TABLE I

Order of magnitude of travel time perturbations for terms in forward tomography problem shown in equation (5). These values are typical for basin-scale transmissions.

| Term | Order of magnitude | Comments |
|---|---|---|
| $\Omega_j$ | 0.2 | From interannual changes in sound speed |
| $\frac{1}{c(O)} \vec{s}_i O(\vec{P}_i - \hat{u}_{ij})$ | 0 to 0.2 | For source displacement of 300 m and $\vec{P}_i = 0$ or $\hat{U}_{ij}$, respectively |
| rerr$_{ij}$ | 0.035 | For receiver positioning error of 50 m |
| $\delta\tau_{ij}$ | 0.015 | Due to internal waves and tides |
| $\epsilon_{ij}$ | 0.001 | For inclination angle of 5° and horizontal and vertical displacement |
| eTl$_{ij}$ | 0.001 | Due to acoustic noise |
| $\frac{1}{c(O)} \vec{es}_i O(\vec{P}_i - \hat{u}_{ij})$ | 0.003 | For 4 m accuracy of local acoustic navigations |

The approximate solutions of equation (5) are derived in which the explicit dependence on the inclination angle of the multipath at the source is dropped for simplicity. In an actual tomography operation equation (5) would be utilized. Dropping the inclination term yields the telemetry equations $$\delta T_{ij} = \Omega_j + \frac{1}{c(O)} \vec{s}_1 O(\vec{P}_1 \hat{u}_{ij}) + e_{tot} \quad (10)$$

where $$e_{tot} \equiv rerr_{ij} + \delta\tau_{ij} + \epsilon_{ij} + eTl_{ij} + \frac{1}{c(O)} \vec{es}_1 O(\vec{P}_1 - \hat{u}_{ij}) \quad (11)$$

In equation (10), $e_{tot}$ is taken to be a Gaussian random variable with mean zero and variance given by $$Var[e_{tot}] = Var[rerr_{ij}] + Var[\delta\tau_{ij}] + Var[\epsilon_{ij}] + Var[eTl_{ij}] + \quad (12)$$

$$Var\left[ \frac{1}{c(O)} \vec{es}_1 O(\vec{P}_1 - \hat{u}_{ij}) \right]$$

In equation (11), it is assumed for simplicity that the origin of the local navigation system was positioned at the origin of the coordinate system so $\vec{s}=0$.

Solutions to the telemetry equations (10) have errors that are upper bounds to solution errors for the full forward tomograph problem in equation (5). This follows because equation (5) more completely models the changes in the instrument positions. Inclination terms dropped from equation (5) appear as extra noise terms in equation (10), $e_{tot}$, which in turn increase the errors in the solutions for $\delta c$ and $s_1$. However, it is simpler to investigate solutions to equation (10) than equation (5) because equation (5) involves full tomographic inversions whose solutions depend critically on modelling assumptions for ocean fluctuations. Solutions to equation (10) are less sensitive to modelling assumptions and only solutions for the telemetry equations are shown here.

The telemetry equations are analyzed to determine the fewest number of transmissions required to estimate the OTT. For simplicity, all error terms are set to zero. The speed of sound is set to a constant value. The receivers are assumed to be all at different bearing angles that do not change from one transmission to the next (i.e. $\hat{u}_{ij}$ is constant for $i=1, 2, \ldots, I$). Then, equation (10) simplifies to $$\delta T_{ij} = \Omega_j + \frac{1}{c} \vec{s}_i O(\vec{P}_i - \hat{u}_{ij}) \qquad (13)$$

Some transmissions must be shifted to estimate the OTT. Consider the equation (13) has J unknowns, $\Omega_j$, plus 2I unknowns, $\vec{s}_i = (si(x), si(y))$, giving a total of $$N_u = J + 2I \qquad (14)$$

unknowns. Equation (13) is determined or overdetermined, with proper choice of $\vec{P}_i$, if the number of equations, I·J, is greater than or equal to the number of unknowns, $N_u$.

This implies $$J \leq 2I/(I-1) \qquad (15)$$

$$I \leq J/(J-2) \qquad (16)$$

A proper choice of $\vec{P}_1$ is one in which the I·J equations contain at least $N_u$ linearly independent equations. The telemetry equations given by equation (10) can yield solutions for the OTT without yielding information about the position of the source because the multipath inclination terms are dropped. The condition given by equation (16) is thus an upper bound for the minimum number of transmissions required to estimate the OTT.

Figure 2:
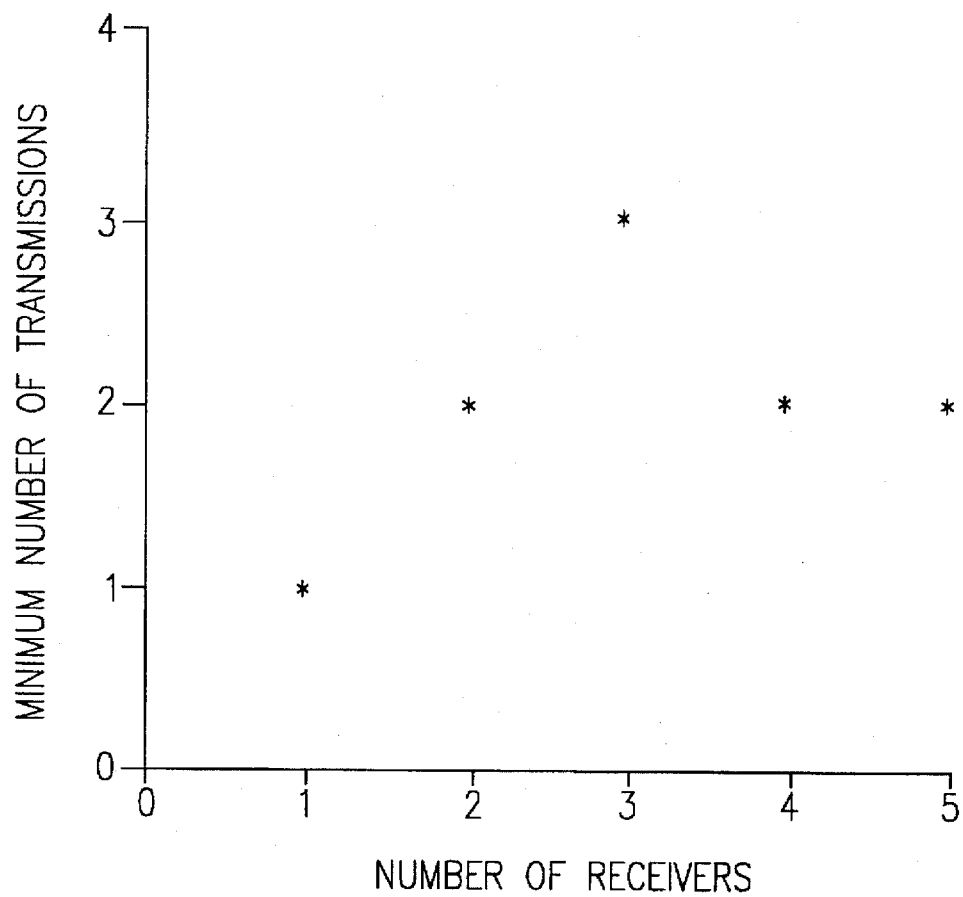
FIG. 2 shows the minimum number of source transmissions needed to determine ocean travel time (OTT), as a function of the number of receivers.

As described below, the fewest number of transmissions needed to estimate the OTT are derived. One transmission is required for one receiver. Two transmissions determine the OTT if there are two receivers or if there are four or more receivers. FIG. 2 shows the minimum number of transmissions needed to determine OTT as a function of the number of receivers. Three transmissions are required for three receivers.

The upper bounds for the errors of the OTT and the source localization from the telemetry equations given values of $e_{tot}$, typical for basin-scale transmissions can now be estimated. The sensitivity of these errors to different methods of selecting the I shift vectors $\vec{P}_i$ is explored. Numerical solutions are evaluated for several specific arrangements of fixed and drifting receivers. Only determined and overdetermined cases are considered. Solutions are obtained using standard least-squares, as shown in C. L. Lawson and R. J. Hanson, "Solving least-square problems", Prentice-Hall Co. (1974).

For simplicity, solutions are found for sources and receivers distributed on a plane so that $\vec{u}_{ij} = \vec{v}_{ij}$. The following values are assumed. The speed of sound is taken to equal 1500 ms$^{-1}$. There are 12 transmissions at two hour intervals per day so I=12. The standard deviations of the measured arrival times, due to acoustic noise, are set to Std $[eT1_{ij}] = 0.001$ s, somewhat larger than measured, as shown in J. L. Spiesberger and K. Metzger, "Basin-scale tomography: A new tool for studying weather and climate," *Journal of Geophysical Research*, 96, 4869–4889 (1991), where the standard deviation of a variable a is denoted Std[a].

For each acoustic multipath, it's assumed that variations in $\delta T_{ij}$ are due solely to internal waves and tides. The expected value of $\delta \tau_{ij}$ is zero because it is demeaned by its OTT as shown in equation (8). A value of Std$[\delta \tau_{ij}] = 0.020/(10)^{1/2} = 0.006$ s is taken. The value of 0.020 s comes from experimental values of the standard deviation of arrival time for single multipaths during an interval of one day along a 3000 km section in the northeast Pacific, as shown in Spiesberger and Metzger (1991), supra. There are about 16 multipaths at 3000 km and their travel time variations over a day are assumed to be statistically independent. Assuming that 6 multipaths have faded, the standard deviation of the average of the remaining 10 multipaths is a factor of $1/(10)^{1/2}$ that given by the standard deviation of one multipath.

The smallest RMS error that can be obtained for the OTT is Std$[\delta \tau_{ij}]/(12)^{1/2} = 0.006/(12)^{1/2} = 0.0017$ s. This minimum value is obtained if the source is fixed at the origin and arrival times are measured to within 0.006 s from each of twelve transmissions.

Cases are considered where the multipath's inclination angles at the source are only within five degrees of the horizontal to minimize the error term $\epsilon_{ij}$. The standard deviation of $\epsilon_{ij}$ for RMS horizontal mooring excursions of about 200 m is thus about 0.0005 s. The vertical excursion of the source is assumed to be no more than 25 m. The largest value for $\epsilon_{ij}$ is then about 0.0015 s. Taken, Std$[\epsilon_{ij}] = 0.001$ s.

The standard deviation of the position of the source in the local navigation system, $$Std\left[\frac{1}{c(O)} \vec{es}_i O(\vec{P}_1 - \hat{u}_{ij})\right] \qquad (17)$$

is taken to be 4 m.

When all transmissions are unshifted, there is no information about the OTT or about the location of the source except that their a priori standard deviation of the OTT is infinite; no information is available about the average speed of sound between the source and each receiver without shifting the start times of the transmissions. If the full tomographic forward problem was solved, the full inverse would impose an upper limit for the a priori value of the OTTs standard deviation through imposed constraints on the sound speed field.

The a priori uncertainty of the source position is specified as follows. The position, $\vec{s}_1$, of the source is assumed to have a displacement, |s|, uniformly distributed in the interval (O,R). The bearing angle, $\psi$ from the origin to the source is uniformly distributed in the interval (0.2$\pi$). Random variables for the displacement and bearing angles are assumed to be uncorrelated. The mooring displacement in the x coordinate is $\delta s(x) = |s| \cos \delta \psi$. The mean of s(x) is zero because $\psi$ is uniformly distributed in the interval (0.2$\pi$). The variance of s(x) equals $R^2/6$. For R=500 m, the Standard deviation of s(x) equals 204 m. Because of symmetry, the standard deviation of the source displacement along the y axis is the same.

Figures 3A, 3B, 3C:
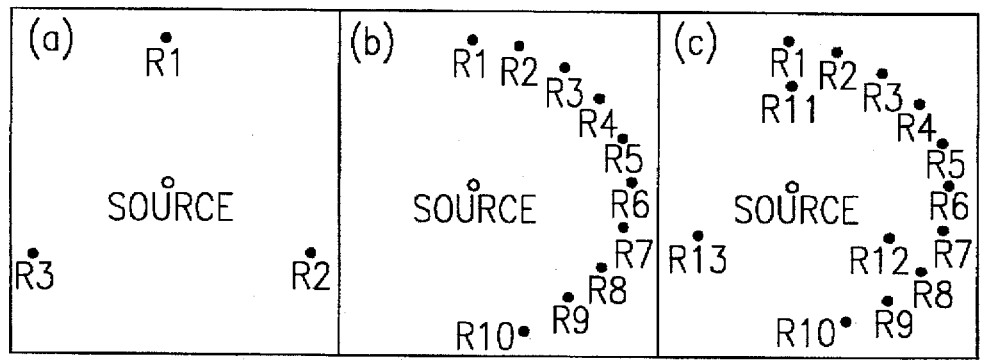
FIGS. 3a, 3b, and 3c show, respectively: (a) plan view of positions of an acoustic source and three receivers (R1, R2, and R3); (b) plan view of positions of an acoustic source and ten receivers (R1 to R10), and (c) plan view of positions of an acoustic source and thirteen receivers (R1 to R13). Receivers R11, R12, and R13 are fixed, while the first ten receivers are drifting.

Referring to FIG. 3a, three fixed receivers R1, R2, R3 are positioned at each of the vertices of an equilateral triangle, with a source S1 moored at the center of the triangle.

In case 1, all transmissions are unshifted and the tomographic transmissions convey no extra information about the OTT or the position of the source. Consequently, the standard deviations of the OTT and each horizontal coordinate of the source position are $\infty$ and 204 m, respectively.

In case 2, the first transmission is unshifted and the next three transmissions shift times for receivers at bearings of 0°, 120°, and 240° true. This pattern is repeated three more times. OTT can be estimated with RMS errors of only 0.0028 s (Table II). This is much less than the criterion of 0.02 s. The standard deviations of the x and y components of the source position, Std[s(x)] and Std[s(y)], are 7.9 and 8.2 m, respectively.

Case 3 is the same as case 2 except no unshifted transmissions are made (Table II). Results for the OTT are slightly worse than case 2. Results for other simulations, not shown here, also show that errors in the OTT are slightly reduced if some unshifted transmissions are used. This follows because unshifted transmissions have no timing errors while shifted transmissions have timing errors due to errors in the local navigation system.

suring inerannual temperature variability, it is not necessary to shift the transmissions towards particular receivers to obtain satisfactory results.

RMS errors of the OTT are estimated for drifting receivers. Let the RMS error for the measured position of a receiver be denoted Std[rerr$_{ij}$]. The position fixes are

TABLE II

Telemetry results for fixed receivers. Standard deviations of ocean travel time, Std [$\Omega_j$], and x and y coordinates of source position, Std [s$_i$(x)] and Std [s$_i$(y)], are indicated for different cases. Case 1 is result when all transmissions are unshifted. See section 6 for a description of these results.

| Case | FIG. | Schedule | # Fixed | # Drifters | Std [rerr$_{ij}$] (m) | Std [$\Omega_j$](s) Fixed | Std [$\Omega_j$](s) Drifter | Std [s$_i$(x)] (m) | Std [s$_i$(y)] (m) |
|---|---|---|---|---|---|---|---|---|---|
| 1 | — | All transmissions unshifted | 3 or 10 | 0 | — | ∞ | — | 204 | 204 |
| 2 | 4A | Unshifted shift to each of 3 rec. at bearings of 0°, 120°, and 240° T. Repeat twice more | 3 | 0 | — | 0.0028 | — | 7.9 | 3.2 |
| 3 | 4A | Shift to each of 3 rec. at bearings of 0°, 120°, and 240° T. Repeat 3 more times | 3 | 0 | — | 0.0029 | — | 7.6 | 7.6 |
| 4 | 4B | Unshifted, shift to each of 3 bearings of 0°, 120°, and 240° T. Repeat twice more | 10 | 0 | — | 0.0022 | — | 4.2 | 4.6 |
| 5 | 4B | Shift to R1 to R10 and then shift R1 and R2 again | 10 | 0 | — | 0.0023 | — | 4.2 | 4.2 |

Small errors in the OTT can be obtained even when transmissions are not shifted toward the receivers. In case 4, ten receivers are arranged in a semi-circle pattern as shown in FIG. 3b. The first transmission is unshifted and the next three transmissions compensate at bearing angles of 0°, 120°, and 240° true. This transmission schedule is repeated three more times. Results are better than case 2 because there are more receivers and thus more data available for estimating unknown parameters. OTT have RMS errors of 0.0022 s.

Case 5 is the same as case 4 except source transmissions are shifted in the directions of each of the 10 receivers.

assumed to have statistically independent errors. Assuming independent errors and assuming the section to each drifting receiver changes little over 12 transmissions, one can interpret the results given below as though there is only one receiver whose position fixes have an error given by Std [rerr$_{ij}$]/12½.

TABLE III

Same as Table II except these are results for drifting receivers. Case 6 gives results when all transmissions are unshifted:

| Case | FIG. | Schedule | # Fixed | # Drifters | Std [rerr$_{ij}$] (m) | Std [$\Omega_j$](s) Fixed | Std [$\Omega_j$](s) Drifter | Std [s$_i$(x)] (m) | Std [s$_i$(y)] (m) |
|---|---|---|---|---|---|---|---|---|---|
| 6 | — | All transmissions unshifted | 0 | 10 | 40–120 | — | ∞ | 204 | 204 |
| 7 | 4B | Unshifted, shift to each of 3 bearings of 0°, 120°, and 240° T. Repeat twice more | 0 | 10 | 40 | — | 0.010 | 25 | 29 |
| 8 | 4B | Same | 6 | 10 | 80 | — | 0.020 | 55 | 51 |
| 9 | 4B | Same | 0 | 10 | 120 | — | 0.030 | 74 | 85 |

Numerical results are only a little better than values obtained for case 4 (Table II). Since the errors in cases 4 and 5 for the OTT are much smaller than 0.02 s, the criterion for mea- For all the cases given below, the drift of each receiver is set in a random direction with a speed of 10 cms$^4$. The maximum displacement of each receiver is thus about 8.6 km over a period of a day.

Case 7 has 10 drifting receivers at the positions indicated in FIG. 3b. The first transmission is unshifted. The next three transmissions are shifted for receivers at bearings 0°, 120°, and 240° true. This pattern is repeated three more times. Navigation fixes for each receiver are taken to have standard deviations of $Std[E_{ij}]=40$ m. OTT have RMS errors of 0.010 s (Table III).

Cases 8 and 9 are the same as case 7 except navigation fixes are degraded to RMS values of 80 and 120 m, respectively. OTT have RMS errors of 0.020 and 0.030 s, respectively. These results suggest that hydrophones need only be located to within 80 m, assuming statistically independent errors for receiver fixes, to satisfy the criterion that RMS errors in the OTT be less than 0.02 s.

OTT errors at drifting receivers can be decreased by adding a few fixed receivers. Cases 11, 12, and 13 are the same as cases 7, 8, and 9 except there are three additional fixed receivers located near each vertex of an equilateral triangle, as shown in FIG. 3c. For drifting receivers, RMS errors for the OTT are less than cases 7, 8, and 9 because data from the fixed receivers help determine positions of the acoustic source. Even with navigational errors as poor as 120 m (case 13), OTT have RMS values of only 0.023 s at the drifting receivers (Table IV).

respect to the reference position is H. The maximum time shift of the telemetry scheme described above is H/c. Typically, H=300 m so H/c≈0.2 s. Then additional time shifts could be added of say 1 s increments that code information about the depth of the source. The receivers would know that time shifts greater than ±0.2 s could not be due to horizontal displacement, and would find the closest 1 s interval to the measured time shift. The receivers then subtract away integer multiples of the 1 s time shift and remember how many 1 s intervals, $N_{shift}$ are subtracted. The remainder leaves the time shifting from the telemetry scheme described in the body of this paper. For example, if the depth of the source is divided into 50 m bins centered on the reference depth, then if the source is one bin below the reference bin, the transmission is delayed by an additional is and the receivers find $N_{shift}=1$ and know which depth bin the source is in.

Tomographic transmissions can be made over 4000 km distances using 197 dB sources that have efficiencies exceeding 50%. The energy required to run such autonomous sources for several years is easily met with standard battery packs used in tomography experiments. Such sources exist, as shown in M. Slavinsky et al., "A small-efficient electromagnetic acoustic source for climatic moni-

TABLE IV

Same as Table II except these are results for fixed and drifting receivers. Case 10 gives results when all transmissions are unshifted.

| Case | Figure | Schedule | # Fixed | # Drifters | Std [rem$_{ij}$] (m) | Std [$\Omega_i$](s) Fixed | Std [$\Omega_i$](s) Drifter | Std [s$_i$(x)] (m) | Std [s$_i$(y)] (m) |
|---|---|---|---|---|---|---|---|---|---|
| 10 | — | All transmissions unshifted | 3 | 10 | 4–120 | ∞ | ∞ | 204 | 204 |
| 11 | 4C | Unshifted, shift to each of 3 rec. at bearings of 0°, 120°, and 240° T. Repeat twice more | 3 | 10 | 40 | 0.0027 | 0.0082 | 7.4 | 6.4 |
| 12 | 4C | Same | 3 | 10 | 80 | 0.0028 | 0.016 | 7.2 | 7.5 |
| 13 | 4C | Same | 3 | 10 | 120 | 0.0028 | 0.023 | 7.5 | 7.3 |

Figure 4A:
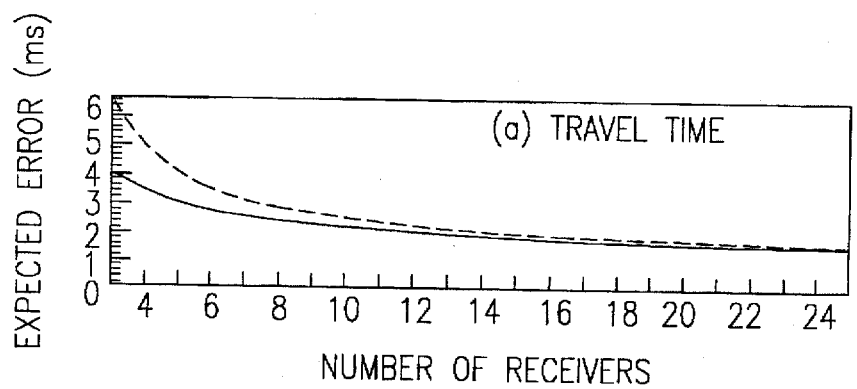
FIGS. 4a and 4b show, respectively, standard deviation of (a) OTT and (b) source position as a function of number of fixed receivers.
Figure 4B:
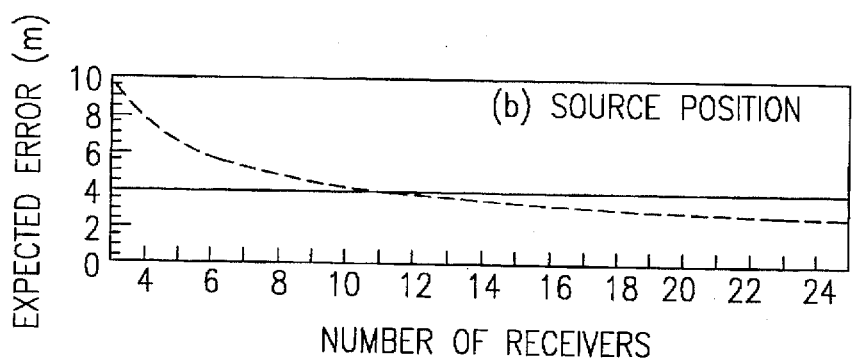

Errors of the OTT are always slightly greater in real time than in post-experimental analysis, as shown in FIG. 4a. Realtime errors of the source position are smaller than those given by the local navigation system if there are enough receivers, as shown in FIB. 4b.

The above analysis has shown how to shift the transmission times of tomographic transmissions so that aberrations in travel time due to horizontal wandering of the source can be largely removed in real time. Clock drifts at the source can be corrected in real-time using standard techniques.

As shown in B. D. Cornuelle (1983), supra, changes in source depth change the travel times of acoustic multipaths. It is therefore desirable to estimate the depth of the source in real time to correct the travel times. Two schemes are suggested here. Neither scheme requires additional battery energy over and above that used in traditional tomography experiments. Firstly, a model can be used to estimate the depth of the source from the horizontal position of the source. Secondly, the source's depth can be estimated by shifting the start times of the transmissions by amounts larger than possible due to travel time changes due to horizontal displacements of the source. For example, suppose the maximum horizontal displacement of a source with toring of ocean temperatures", Journal of the Acoustical Society of America, 94, No. 4 Pt. 2, 2349.

B. D. Cornuelle (1983) (1985), supra, suggested that the source wander might be estimated using changes in the travel times of multipaths with different inclination angles at the source. It is not yet known how well his method works at basin scales. In any case, one wants to use his scheme and the telemetry scheme presented here to optimally estimate the oceanographic travel times in real time using equation (5).

Solutions to the telemetry equations depend on the magnitude of the compensation vector, $\vec{P}_i$, when transmissions are shifted. For shifted transmissions, a magnitude of one is used. Slightly improved estimates for the OTT can be obtained if the magnitude of $\vec{P}_1$ is between zero and one, for example, one-half. Optimum values for this magnitude can be obtained for actual geometries using Monte Carlo simulations.

TABLE V

Nomenclature

| | |
|---|---|
| $c$ | reference field of sound speed |
| $eT1_{ij}$ | measured error in arrival time of multipath due to noise |
| $e_{tot}$ | error term for telemetry equations |
| $i$ | subscript denoting transmission number |
| $j$ | subscript denoting receiver number |
| $k$ | local unit vector pointing up |
| $\vec{r}_{ij}$ | measured position of receiver |
| $\vec{r}_{ij} + \delta\vec{r}_{ij}$ | actual position of receiver |
| $rer_{ij}$ | change in travel time of a multipath due to errors in measured position of receiver. See equation (4.7) |
| $\vec{s}_i$ | geographic location and depth of source in reference frame of local navigation system |
| $(s_i(x), s_i(y))$ | the x and y Cartesian coordinates of $\vec{s}_i$ |
| $\vec{s}$ | vector from defined coordinate origin at $\vec{0}$ and origin of reference frame of local navigation system for source. See equation (4.2) |
| $\vec{S}_i$ | actual position of source relative to coordinate origin at $\vec{0}$ |
| $T0_{ij}$ | reference arrival time for any multipath between origin and measured position of receiver. Arrival time is computed through reference sound speed field |
| $T1_{ij}$ | measured arrival time for any multipath between actual positions of source and receiver |
| $\hat{u}_{ij}$ | unit bearing vector of geodesic at origin pointing to measured position of receiver |
| $\hat{v}_{ij}$ | unit bearing vector of geodesic at measured position of receiver pointing away from origin |
| $\beta_{ij}$ | inclination angle of multipath at receiver |
| $\delta c$ | actual field of sound speed minus reference field of sound speed |
| $\delta\vec{r}_{ij}$ | error in measured position of receiver |
| $\delta T_{ij}$ | measured arrival time minus reference travel time |
| $\delta\tau_{ij}$ | difference between $\Omega_j$ and actual travel time perturbation of a multipath for transmission i due to changes in speed of sound |
| $\epsilon_{ij}$ | sum of small inclination terms for travel time change found in forward problem for tomography. See equation (4.9) |
| $\Omega_j$ | ocean travel time (OTT) is average value, over 1 transmissions, of travel time perturbation of a multipath due to changes in speed of sound. See equation (4.6) |
| $\theta_{ij}$ | inclination angle of multipath at origin |

REFERENCES

Birdsall, T. G. (1984), Acoustic telemetry for ocean acoustic tomography, *Institute of Electrical and Electronics Engineers Journal of Oceanic Engineering*, 9, 237–241.

Brewer, P. G., Glover, D. M., Goyer, C. and Shafer, D. K. (1993), pH of the North Atlantic Ocean; Improvements to the global model for sound absorption in sea water,(in preparation).

Cornuelle, B. (1983). Inverse methods and results from the 1981 ocean acoustic tomography experiment. Ph. D. dissertation, Massachusetts Institute of Technology and Woods Hole Oceanographic Institution.

Cornuelle, B. D. (1985). Simulations of acoustic tomography array performance with untracked or drifting sources and receives. *Journal of Geophysical Research*, 90, 9079–9088.

Gill, A. E. (1982), Atmosphere-ocean dynamics, Acdemic Press, San Diego.

Halpern, D. (1987). Observations of annual and El Nino thermal and flow variations at 0°,110° W. 0°, 95 ° W. during 1980–1985. *Journal of Geophysical Research*, 92, 8197–8212.

Hayes, S. P., Mangum, L. J., Picaut, J., Sumi, A. and Takeuchi, K. (1991). TOGA-TAO; A moved array for real-time measurements in the tropical Pacific ocean. *Bulletin American Meteorological Society*, 72, 339–347.

Howe, B. M., Mercer, J. A., Odom, R., Spindel, R. C., Birdsall, T., Metzger, K. and Worcester, P. F. (1990). Applied tomography; monitoring the Gulf Stream extension, *Journal of the Acoustical Society America*, Supplement, 1, 88, S119.

Kwon, H. M. and Birdsall, T. G. (1991), digital waveform codings for ocean acoustic telemetry. *Institute of Electrical and Electronics Engineers Journal of Oceanic Engineers Journal of Oceanic Engineering*, 16, 56–65.

Lawson, C. L., and Hanson, R. J. (1974). *Solving least-squares problems*, Prentice-Hall, Englewood Cliffs, N.J.

Liberstore, S. P. (1985). Modified quad-M interrogator. Internal report, Department of Applied Ocean Physics and Engineering, Woods Hole Oceanographic Institution, Woods Hole, Mass.

Liberstore, S. P. and Schuler, F. (1984), SAIL acoustic modem, Internal Report, Woods Hole Oceanographic Institution, Woods Hole, Mass., Ocean Industry Program.

Munk, W. H. and Forbes, A. M. G. (1989). Global ocean warming: an acoustic measure? *Journal of Physical Oceanography*, 19, 1765–1778.

Philander, S. G. (1990), *El Nino, La Nina, and the Southern Oscillation*, Academic Press, San Diego.

Frisk, G. V. and Von Alt, C. (1991). Seismo-acoustic characterization of the elastic waves on the continental shelf (SCOTEC). Woods Hole Oceanographic Institution proposal 6889.0.

Slavinsky, M., Bogolubov, B. and Spiesberger, J. (1992). A small-efficient electromagnetic acoustic source for climatic monitoring of ocean temperature, *Journal of the Acoustical Society of America*, 94, No. 4 Pt. 2, 2349.

Spiesberger, J. L. (1992a), Listening for climatic temperature change in the ocean. *Proceedings of the Oceanology International 92 Conference*, Brighton, UK.

Spiesberger, J. L. (1992b). It is cheaper to map Rossby waves in the global ocean than in the global atmosphere? *Journal of Marine Environmental Engineering*.

Spiesberger., J. L. Birdsall, T., Metzger, K., Knox, R., Spofford, C. and Spindel, R. (1983). Measurement of Gulf Stream meandering and evidence of seasonal thermodine development using long range acoustic transmissions, *Journal of Physical Oceanography*, 13, 1836–1846.

Spiesberger, J. L., Bushong, F. J., Metzger, K., and Birdall, T. G. (1989a), Ocean acoustic tomography; estimating the acoustic travel time with phase. *Institute of Electrical and Electronics Engineers Oceanic Engineering*, 14, 108–119.

Spiesberger, J. L. Bushong, P. J., Metzger, K., and Birdsall, T. G. (1989b). Basin-scale tomography; synoptic.

Figure 5:
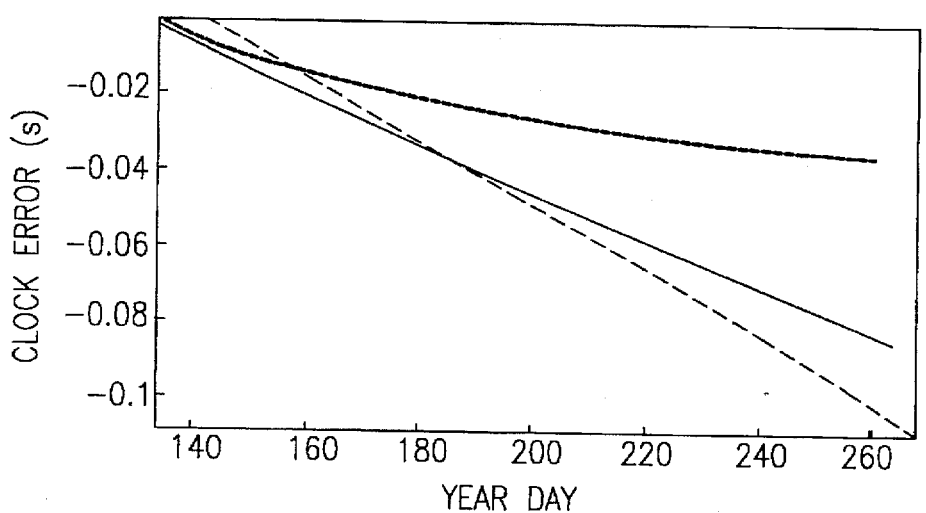
FIG. 5 shows clock errors of a low precision oscillator from three FIG. 1 source moorings.

It is necessary to account for timing errors in the start times of acoustic transmissions. One scheme used tomographers is where a high precision rubidium frequency oscillator is turned on once or twice a day to check the frequency error of a less precise oscillator. The less precise oscillator draws relatively little power and continuously maintains time at the source. The frequency drift of the less precise oscillator has time scales much longer than a day, as shown in FIG. 5. Transmission timing errors are corrected to within a few milliseconds after the mooring is recovered. Additionally, time checks of the source are made from ship before and after setting the mooring, as shown in P. F. Worcester et al., "AVATAR: Second-generation transceiver electronics for ocean acoustic tomography", *OCEANS 85 Conference Record*, San Diego, Calif., Nov. 12–14 1985, pp. 654–662.

Clock errors should be corrected in real-time. This can be accomplished with a standard procedure. The source can calculate its clock error by integrating the measured frequency offsets, $\Delta f$, between the high and low precision oscillators. The estimated clock error at geophysical time $t_k$ is approximately, $$\delta T_{clock}(t_k) = \sum_{k}^{k-1} \frac{\Delta f(t_k)}{f(t_k)} (t_k + 1 - t_k) \tag{18}$$

where fractional frequency errors, $\Delta f(t_k)/f(t_k)$, are measured at geophysical time $t_k$. The center frequency of the less precise oscillator is $f$. The source need only shift the start time of each transmission according to equation (18) for real time monitoring. Confidence in this scheme can be improved by checking the clock to within 0.0005 s from modems deployed from ships during the experiment, as shown in S. P. Liberatore and F. Schuler, "SAIL acoustic modem", *Internal report, WHOI, Ocean Industry Program* (1985).

For simplicity in the following discussion about the minimum number of transmissions required to estimate the OTT, the speed of sound is set to one. Only one shifted-transmission is required to estimate the OTT with one receiver. This can be seen by writing equation (10) as $$\delta T_{11} = \Omega_1 + \vec{s}_j O(\vec{P}_1 - \hat{u}_{11}) \tag{19}$$

If one chooses $\vec{P}_1 = \hat{u}_{11}$, one has $\Omega_1 = \delta T_{11}$. The position of the source is not obtained in real time. The x coordinate of the source can be determined in real time for subsequent transmissions if subsequent transmissions are unshifted.

With two receivers, no loss of generality is made if one sets $\hat{u}_{11} = (1,0)$ and $\vec{P} = (1,0)$.

For transmission one, the telemetry equation reduces to $$\delta T_{11} = \Omega_1 \tag{20}$$

$$\delta T_{12} = \Omega_2 + s_1(x)(1 - u_{12}(x)) - s_1(y) u_{12}(y) \tag{21}$$

Equations (20) and (21) are insufficient to estimate $\Omega_2$. For transmission two, the telemetry equations are $$\delta T_{21} = \Omega_1 + s_2(x)(p_2(x) - 1) + s_2(y) p_2(y) \tag{22}$$

$$\delta T_{22} = \Omega_2 s_2(x)(p_2(x) - u_2(x)) + s_2(y)(p_2(y) - u_2(y)) \tag{23}$$

Equations (2), (22) and (23) constitute three equations and five unknowns so $\Omega_2$ is undetermined unless $\vec{P} = (u_{12}(x), u_{12}(y))$ is chosen. Then equation (23) is just $\delta T_{22} = \Omega_2$ and the problem is solved. The remaining equations, (21) and (22), specify that the positions of $\vec{s}_1$ and $\vec{s}_1$ lie on two different lines. No further information about the positions $\vec{s}_1$ and $\vec{s}_2$, can be determined. Coordinates of the source during transmissions three, four, etc. can be determined in real time using unshifted transmission times.

With three receivers, set $\vec{P} = (1,0)$ and $\hat{u}_{11} = (1,0)$.
For the first transmission, one obtains:

$$\delta T_{11} = \Omega_1 \tag{24}$$

$$\delta T_{12} = \Omega_2 + s_1(x)(1 - u_{12}(x)) - s_1(y) u_{12}(y) \tag{25}$$

$$\delta T_{13} = \Omega_3 + s_1(x)(1 - u_{13}(x)) - s_1(y) u_{13}(y) \tag{26}$$

One has $\Omega_1$ but still needs two other OTTs and one only has two equations, (25) and (26) to estimate the four unknowns, $\Omega_2, \Omega_3, s_1(x)$, and $s_1(y)$. For transmission two, one has three more equations and two more unknowns, $s_2(x)$ and $s_2(y)$ giving five total equations in six unknowns. One could shift the second transmission toward the second receiver to obtain $\Omega_2$, but this still leaves $\Omega_3$ unknown. Thus, one needs three transmissions to estimate all three OTTs. Referring back to equation (16), one sees that with J=3 receivers, the telemetry equations are determined for I=3 transmissions if transmission schedules are chosen to make the nine equations linearly independent. It is easy to make these equations linearly independent (e.g. $\vec{P}_1 = (1.0)$, $\vec{P}_2 = (u_{22}(X), u_{22}(y))$, and $\vec{P}_s = (0,0)$. In this case three is the minimum number of transmissions required for obtaining the OTT and this also yields the positions of all three sources.

Without loss of generality, with four or more receivers, one can set $\vec{P}_1 = (1,0)$ and $\hat{u} = (1,0)$. The four telemetry equations for the first transmission contain six unknowns, four OTTs and $(s_1(x), s_1(y))$, so there is no way to obtain the OTT for receivers two, three, and four. A second transmission is required. If $\vec{P}_2$ is not linearly related to $\vec{P}_1$, there are now eight linearly independent equations in eight unknowns, and the equations are determined. All OTT and all source coordinates can be found. Equation (16) gives this result because for J=4, It says I≤2 to determine the parameters. With four or more receivers, all parameters can be determined with two transmissions.

The acoustic signal-to-noise ratio at the receiver is approximately:

$$D = D_{sl} - D_{gl} - aR - D_{noise} + D_{array} + 10 \log N \text{(dB)}$$

where the source level is $D_{gl}$, the geometric spreading loss is D$\delta$h, the absorption coefficient is $\alpha$, and the distance from the source to the receiver is R (R. J., "Principles of Underwater Sound." 3rd edt. McGraw-Hill (1983). The noise in the transmitted bandwidth is $D_{noiseg}$, and the array gain is $D_{array}$. The pulse compression gain is $10 \log N$ where the number of digits in the transmitted code is N (Spiesberger et al., 1980, supra) For a center frequency of 250 Hz and a bandwidth of 50 Hz and for:

$d=20$ dB (received signal-to-noise)

R=4000 km $D_{noise} = 70 + 10 \log = 87$ dB (noise level in a 50 Hz band near 250 Hz)

$\alpha = 0.0074$ dB km$^{-1}$(typical North Atlantic)

$$D_g l = 10\log\frac{(5\times 10^3 \text{ m})^2}{(1 \text{ m})^2} + 10\log\frac{4000 \text{ km}}{5 \text{ km}} = 103 \text{ dB}$$

$$D_{array} = 6 \text{ dB}$$

$$N = \frac{82 \text{ s}}{0.02 \text{ s}} = 4100$$

One requires a source level equal to 197 dB (1983, supra). The geometric spreading loss is calculated for spherical spreading up to 5 km followed by cylindrical spreading up to 4000 km. Pulse compression gain is that energy added over an 82 s transmission where the digit duration, 0.02 s is the reciprocal of the acoustic bandwidth of 50 Hz. The acoustic power emitted from a 197 dB source is about 389 W (1983, supra).

The attenuation coefficient is sensitive to the pH. Recent estimates of the pH in the North Atlantic differ significantly from past estimates, and the value of the attenuation coefficient in many ocean regions is still under discussion (Brewer et al., 1991). Near about 1 km depth in the North Pacific, the pH is about 7.9 yielding an associated attenuation coefficient of about 0.003 dB km$^1$. For a 4000 km section in the North Pacific, the attenuation amounts to 4000×0.003=12 dB instead of 4000×0.0074=30 dB for the North Atlantic.

If one transmits twelve times per day every five days, and if each transmission lasts 82 s, one requires 2.8×10$^7$ joules per year. If the source is 50% efficient, one needs to store 5.6×10$^7$ joules in the batteries. Traditional tomography moorings carry batteries providing about 2.7×10$^8$ joules at a cost of about $30,000.

Understanding the dynamics of climate change will depend, on observing planetary waves and other interior structures in the ocean between the meso- and basin-scales (Gill, 1982; Philander, 1990). It is important to minimize the cost of observing these temperature signals. How these costs can be minimized using acoustic tomography is described below. This analysis indicates that it may be less expensive to use sound to map these structures in the world's oceans in real-time than to use radiosondes to measure similar structures in the global atmosphere. The relatively low cost of using sound 5 in the ocean depends in part on new acoustic technology being developed by the Global Acoustic Mapping of Ocean Temperatures group (GAMOT), which comprises J. Spiesberger and D. Frye (Woods Hole Oceanographic Institute), H. Hurlburt and J. McCaffrey (Naval Research laboratory, Stennis), M. Johnson (University of Alaska, Fairbanks), and J. O'Brien (Florida State University).

Because of undersampling, oceanographers have great difficulty resolving temporal variability at large scales inside the ocean (Talley and White, 1987). Because of aliasing, it is difficult to map, for example, monthly changes in the large-scale heat content in the upper 100 m of the northeast Pacific (Wrytki and Uhrich, 1982). Satellites image atmospheric planetary waves and longer-term variations in atmospheric climate, but there is no equivalent instrument for viewing the inside of the ocean. Although satellites image temperature at the sea surface, most of the heat important for climate change resides beneath the surface.

Recent breakthroughs in acoustic monitoring of ocean temperature at basin-scales demonstrate a rapid way to detect and map changes of temperature at large scales inside the ocean with little aliasing (Spiesberger and Metzger, 1991, 1992; Spiesberger et al., 1992). These advances in acoustical remote sensing are as fundamental to ocean science as the advances made by geophysicists who utilize inverse techniques to study the interior of the Earth from seismic records.

Figure 6A:
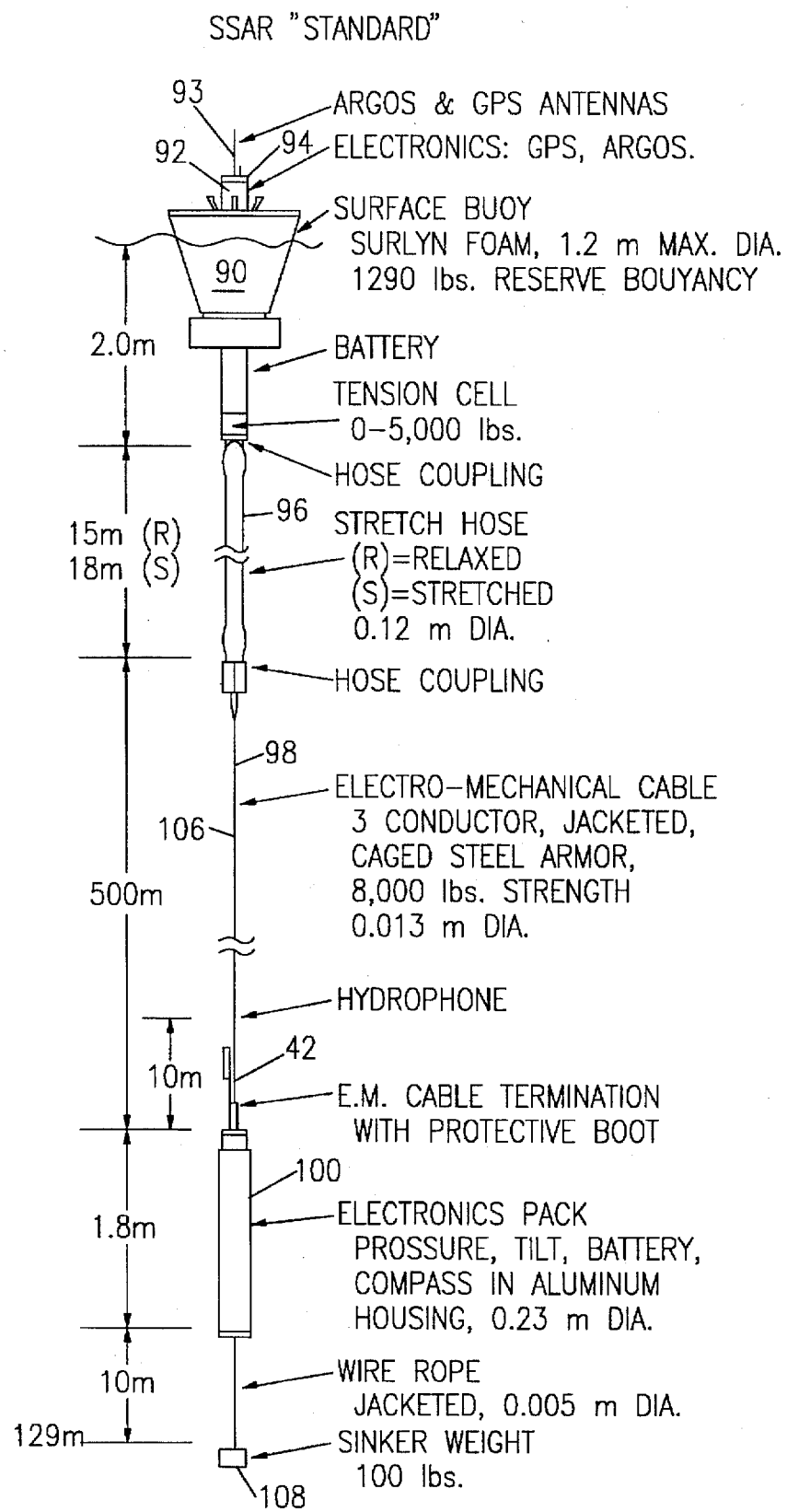
FIG. 6b shows a block diagram of a Snubber SSAR.
Figure 6B:
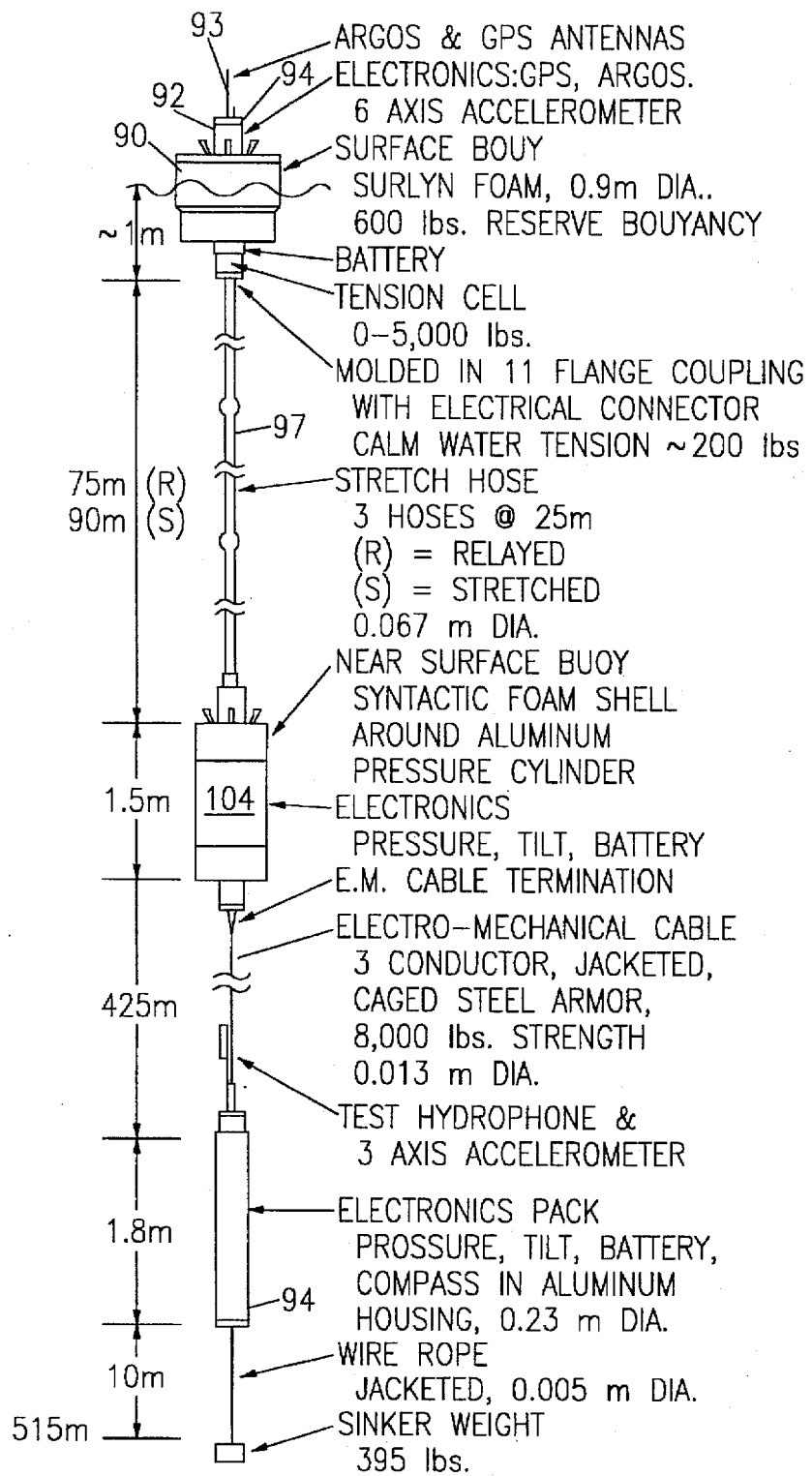

Referring now to FIGS. 6a and 6b, the SSAR concept is similar to a sonobuoy; it suspends an acoustic array at a known depth and telemeters the received data. To be useful for long term travel time measurements across ocean basins, however, the 35 SSAR design had to extend the sonobuoy concept substantially. Table VI shows the general requirements that a successful SSAR design must meet. The mechanical design was driven by the requirement for a one year life to meet the needs for data collection over large space and time scales. This requirement meant that a secure path for the acoustic array data had to be maintained through the air-water interface where wave induced motions raise havoc with electrical conductors. Dynamic loading of the mechanical elements due to waves had to be kept to a minimum to avoid fatigue related failures resulting from the millions of cycles experienced during the course of a year. Finally, a relatively economical and easy to deploy system was required because the SSARs utility is based at least partly on its ease of installation and low cost relative to other long term receivers.

The two designs share many of the same components, differing only in the type of compliant hose used beneath the surface buoy and the distribution of buoyancy, either entirely in the surface buoy (Standard), shown in FIG. 6a, or split between the surface buoy and a subsurface buoy located at the bottom end of the compliant hose section (Snubber), as shown in FIG. 6b. The compliant hose technology, which is an adaptation of the vibration isolation hoses used by the Navy for towing acoustic arrays and the oil transfer hoses used in the oil industry, was chosen for two reasons. First, the hoses are capable of surviving oscillating forces over millions of cycles. Since the electrical conductors are protected within the hose structure, this provides a safe passage between the electromechanical cable and the surface buoy. Second, the hoses provide compliance in the system which substantially reduces snap loads caused by wave action. These snap loads often lead to component failure in drilling systems.

In both SSAR designs, a small surface buoy 90 made of Surlyn foam supports the surface electronics package 92 and provides a platform for the satellite antennas 93. An aluminum pressure case 94 houses the electronics and is used as a central strength member in the buoy. Lifting bales (not shown) and the compliant hose section 96 are tied directly to the pressure case 94. The electrical conductors inside the hose enter the pressure case through a five-pin connector not shown.

The Standard hose 96, shown in FIG. 6a, is 15 m long and 12 cm in diameter. It has a spring constant of about 1500 N/m (100 lbs/ft), allowing it to stretch about 3.0 meter elastically at 4,500N (1,000 lbs) tension. The Standard hose 96 supports the entire weight of the suspended cable 98, electronics housing 100, and acoustic array 102, and provides 1–2 meters of compliance to reduce snap load forces.

The Snubber hose 97, shown in FIG. 6b, is 80 m long and 6.6 cm in diameter. It is a much softer tether with a spring constant of only 120N/m (8 lbs/ft), stretching about 7.5 m at 900N (200 lbs) load. Its lower end connects to a subsurface buoy 104, which supports all but 450N (100 lbs) of the tension of the suspended array, thereby keeping the static hose tension low. The purpose of the Snubber design, shown in FIG. 6b, is to provide a softer, more compliant response to wave frequency motions than is possible with the stiffer Standard design 96. 97 of FIG. 6a.

Figure 7:
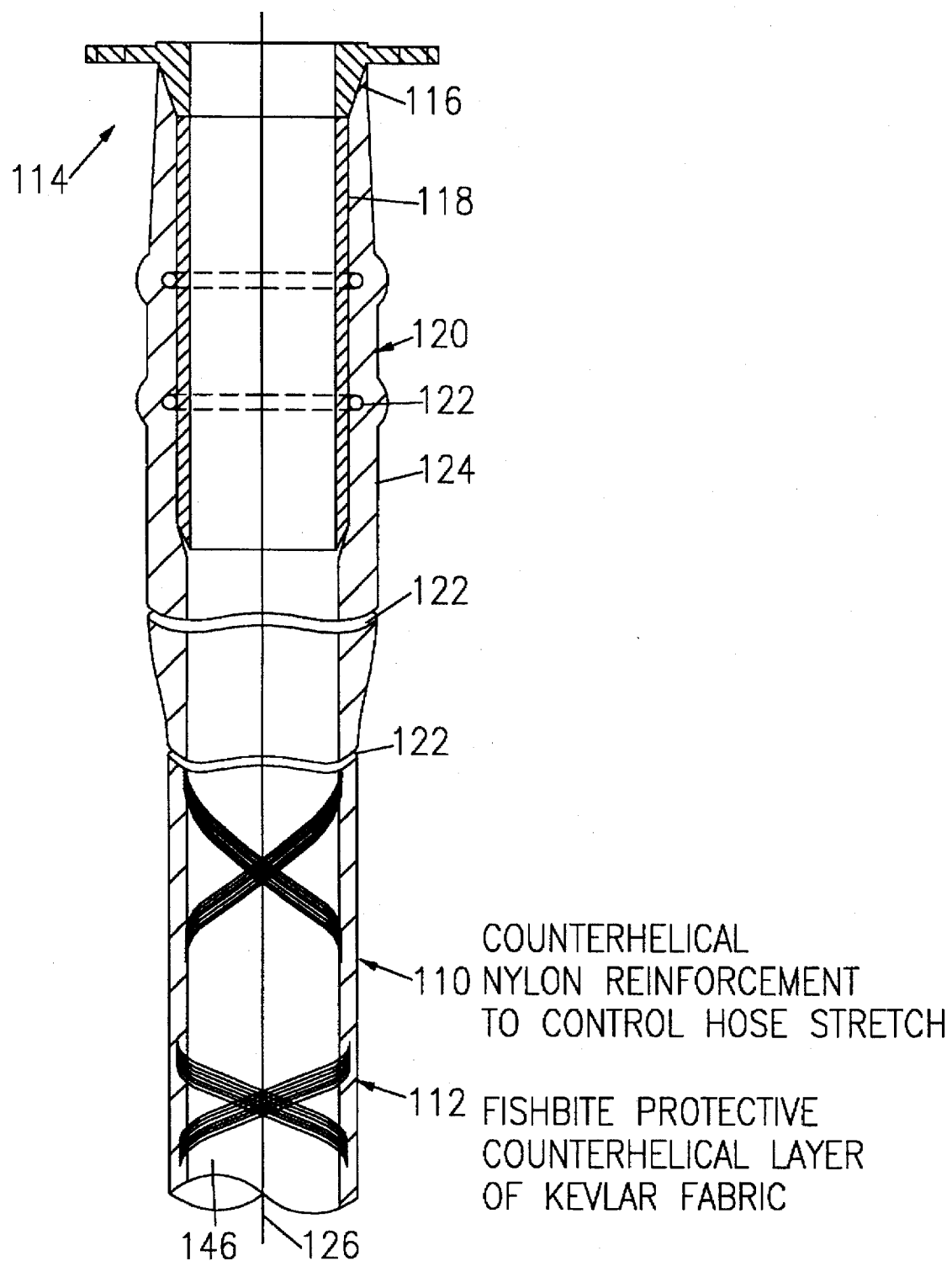
FIG. 7 is a block diagram of SSAR rubber hose construction.

Referring now also to FIG. 7, both hoses 96, 97 are constructed of nitrile butadiene and neoprene rubber and counterhelically arranged and embedded layers of nylon 110 to control hose stretch and Kevlar tirecord reinforcement 112 for fishbite protection. Additional reinforcement is built up at each hose end 114 to increase ruggedness. The nylon reinforcement 110 controls the load-elongation behavior of the hose while the Kevlar reinforcement 112 is added for better cut resistance against fishbite. The hose terminations 114 consist of steel flanges 116 to which pipe sections 118 are welded. The reinforcing layers and nitrile butadiene rubber material 120 are built up over the pipe sections 118, locked on by steel wire wrappings 122, covered with neoprene rubber 124, and consolidated and adhered to the pipe section by vulcanization. The 80 m Snubber hose 97 length is made from three 26.7 m hose sections which are butted together at the flanges, while the Standard hose 96 is a single unit. Fitted end plates are bolted to the upper and lower hose flanges and gaskets are used to seal between the flanges and end plates. Inside the hoses is a stop rope 126 with considerably higher spring constant and strength than the hose 96, 97, which limits the total hose stretch to a prescribed limit, typically 30 percent. Also inside the hose is an electrical conductor assembly, coiled and arranged with enough slack to prevent conductor stretch even at maximum hose elongation. The hose is fluid filled to resist crushing and to maintain a circular cross section under applied tension and external hydrostatic pressure. Electrical penetrators are built into the end plates together with valves to allow filling of the hose with fluid.

Below the hose section is 500 m of three conductor electromechanical cable 106. Cable 106 is a two-layer steel armor construction with an outer polyurethane jacket. The 10 mm diameter cable has a breaking strength of 36,500N (8,200 lbs) and is torque-balanced. The EM 106 cable terminates at the lower pressure case 56 from which is suspended a low-frequency, tomographic acoustic array 42 below which is suspended lead weight 64 used to help maintain a vertical orientation of acoustic array 42. Within pressure case 56, acoustic array 42 is connected to tomographic or acoustic array receiver 58, the output of which is applied by analog to digital (A/D) converter 60 top subsurface processor system 130.

Acoustic array 42 is a six-element, 50 m long array of individually wired hydrophones 132 attached to Kevlar strength member 134. Each hydrophone 132 is individually wired to analog front end 136 in acoustic array 42. At the midpoint of acoustic array 42 is two axis, array tilt sensor 68 which allows the approximate arrival angles of the acoustic signals to be calculated. Array 42 will tilt depending on the local shear in the ocean. The data provided by two axis, array tilt sensor 68 is processed by orientation subsystem 138 in conjunction with subsurface processor system 130. Similarly, the location of acoustic array 42 with respect to surface buoy 43 is collected by ultra short baseline array 82 and applied by USBL A/D converter 140 to Digital Signal Processor (DSP) 142 in conjunction with subsurface processor system 130.

Electromechanical cable 106 connects pressure case 56, and the electronic systems therein with surface pressure case 48 which include the ARGOS and GPS systems described in. FIG. 1 as well as battery pack 144 and acoustic responder 51.

The system of FIG. 1, including multiple SSARs 40 and one or more sources 20 operates with two time schedules.

The main schedule is for tomography reception and data processing. Tomography receptions are synchronized to the source 20 transmission schedules and offset by the estimated travel time from the source 20 to the current SSAR 40, that is, the current receiver position. The second time schedule is for loading data into the Argos transmitter 47. This schedule is designed to maximize data throughput. The sections below describe each of the major subsystems and the general operation of the SSAR 40. Table VII provides detailed information on the system hardware.

The acoustic sources, such as source 20, transmit at least 6 times per day. The SSAR 40 will listen to each source 20 on a different day. Before a source 20 is due to transmit, the system comes out of low-power state and turns on the GPS receiver 45. Using the current time and position from the GPS receiver 45, the estimated travel time from the source 20 is computed using a database of average sound speed. This time, approximately 30 minutes for a basin-scale path, is used to set the time for the tomography data collection to begin. Precise time is transferred over cable 106 to the bottom electronics package using the one pulse per second hardware output of the GPS receiver 45. The bottom system then knows exactly when to begin collecting acoustic data, and that time is saved with the output data and sent back via Argos.

An ultra-short baseline (USBL) acoustic positioning system 82 in the bottom package tracks the position of the acoustic array 42 with respect to the surface buoy 43. The USBL system 82 measures the x-y offset and range from the Surface buoy and does so at a time synchronized with the GPS. This is later processed to yield an exact geographic position.

After the position fix is obtained, the tomography system in pressure case 56 begins collecting data from the array When the reception is complete, the analog system is turned off and the signal processing subsystem, including DSP 142 and processor 130, are activated. The tomography data is beamformed, match-filtered and processed for Dopler shift on the DSP 142. Peaks are picked from the processed data and their arrival time, signal to noise ratio and arrival angle recorded. This output is compressed to an absolute minimum and stored for later transmission back to shore via Argos. After these tasks are completed, the source 20 schedule is consulted to obtain the next data collection time and the system returns to low-power mode.

Identical control computers are used at the surface and bottom as surface and subsurface processors 130. Key features include low power sleep mode, real-time clock wake-up, solid-state power switching for all external devices and a number of configurable serial ports for communication with external devices. At the surface, the control computer has to handle the GPS receiver 45 and the Argos transmitter 47, as well as telemetry to the bottom package 56. Communication to the bottom is single-duplex, but high bandwidth data throughput is easily obtained using differential RS-422. Alkaline battery packs 146 are located in the top and bottom pressure cases. Topside power consumption is governed primarily by the Argos transmitter 47 and the GPS receiver 45. Subsea, the data collection and processing units take similar amounts of power (several watts maximum).

The most important sensor on the SSAR is the low-frequency array 42 suspended beneath the bottom pressure case 56, 500 meters below the surface. The 6 element array 42 is 50 meters long. The size and the number of elements is a trade-off between cost, reliability and performance. Factors considered in the design included array gain, beamforming capability, directional noise, aliasing and physical aspects such as deployment and longevity.

The hydrophone elements 132 are wired to an analog front-end 136 and digitizing subsystem 58. The elements are 2-wire current mode and one twisted pair is required in the array cable for each element. At the midpoint of the array 47 is a two-axis tilt sensor 68. This is included to allow the approximate arrival angles of the acoustic multipaths observed at the array 42 to be calculated. The array 42 will tilt depending on the local current sheer. The hydrophone array cable 42 has a Kevlar outer jacket with breaking strength selected to match the main EM cable Lee to the surface.

The tomography digitizer 60, samples the receiver output at 300 Hz per channel and loads the data into the control computer 130 for later processing by the DSP 142. It is isolated as much as possible to reduce coupling of electrical noise into the low-amplitude acoustic signals. The data are direct transferred to processor memory and then to a non-volatile SRAM disk. After the tomography sampling is finished, the DSP 142 is used to process the data as described above.

The SSAR navigation system is as complex as the tomography data processing system. Components of the system include the GPS receiver 145 at the surface and the USBL acoustic system 82 in the bottom electronics case.

The GPS receiver 145 is an off-the-shelf unit whose accuracy is enhanced from the standard specification of ±100 meters (with Selective Availability turned on), to better than ±20 meters through use of post-processing on shore. Raw satellite data from the receiver 145 on the buoy 43 is sent back via Argos. This data is then used to reconstruct the range data which is then corrected and combined with other information to produce the corrected positions.

To determine where the tomography array 42 is with respect to the surface buoy 43, an ultra-shore baseline acoustic positioning system 82 is used. An acoustic responder 51 at the buoy 43 is triggered by command from below to transmit a coded ping to a high-frequency array 82. This array is a small encapsulated unit mounted just above the pressure case 56 located at the bottom of the cable 106. It has its own analog front-end and digitizer 140, and the data is processed on the floating-point DSP 142. The output of the USBL 82 is azimuth, elevation and acoustic travel time. Several other sensors are used to convert the acoustic information to actual x-y-z offset. To determine the attitude of the high frequency array, a two-axis tilt sensor 68 is used, and rotation is measured by a digital flux-gate compass. Temperature and pressure sensors are used to make sound speed and depth estimates, respectively. The sensor data is combined with the acoustic data to transform coordinate systems and optimally estimate the x-y-z offset.

The size of the weight located beneath the array was chosen to keep the array tilt below 5° for most anticipated situations.

The dynamic analysis was performed by solving the equations of motion of the array cable in the frequency domain using a finite difference scheme. The input to the program is a specified wave spectra. The surface buoy 43 is assumed to be a wave follower so that the input motion at the top of the array is equal to the wave motion. The hydrodynamic forces are modeled with an "equivalent linearized" coefficient. Since the value of this coefficient depends on the response, the solution must be found by iteration.

The computer codes were checked against data collected during the field trials for the Standard (FIG. 6a) and Snubber (FIG. 6b) models. The sea conditions during both tests were comparable with a wave-height standard deviation of 0.50 m and a peak frequency of 0.12 Hz. The motion at the bottom of the array is amplified in the Standard SSAR. This is explained by the fact that the natural frequency of the system, which is associated with the elastic stiffness of the hose, is 0.3 Hz. For the Snubber SSAR, the motion at the bottom of the array is damped. Here, the natural frequency associated with the hose is approximately 0.09 Hz. Numerical predictions of the tension at the surface buoy for the given wave conditions yield a standard deviation of 885N (200 lbs) for the Standard SSAR and 362N (80 lbs) for the Snubber SSAR.

Also, calculations were performed using a sea state corresponding to a strong gale. Inputting a standard deviation of 3.5 m at the surface buoy and a peak frequency of 0.06 Hz predicted motions at the bottom of the Standard SSAR will have a standard deviation of 3.6 m and the tension at the surface buoy will have a standard deviation of 2,400N (540 lbs). For the Snubber SSAR, the standard deviation of the bottom motion is 1.8 m and the standard deviation of the top tension is 1,000N (225 lbs).

Early testing provided important data on the Snubber response to wave frequency motions and also illuminated one problem. The original choice of fill fluid was Isopar, an oil frequently used in towed seismic hoses. This oil, which is 25% lighter than seawater, proved unsuitable because hydrostatic pressure inside the hose was lower than the outside pressure, with the result that the lower 10–15 m of the hose collapsed. No failures occurred during the five-day test, but the collapsed hose lost some of its springiness and twisted along its length like a long ribbon which could have damaged the conductors running down its center. Freshwater 146 is now being used as the fill fluid which is almost as heavy as seawater. Since the hose 114 generates internal pressure as a function of tension, the small difference between freshwater and seawater will not produce hose collapse.

References

[1] J. L. Spiesberger, D. E. Frye, J. O. O'Brien, H. Hurlburt, J. W. McCaffrey, M. Johnson, and J. Kenny, "Global acoustic mapping of ocean temperatures (GAMOT)," IEEE Oceans '93 Proceedings, 1-253-1-257, 1993.

[2] J. Shriver, M. Johnson, and J. O'Brien, "Analysis of remotely forced oceanic Rossby waves off California," J. Geophys. Res., Vol. 96, 749–757, 1991.

[3] A. J. Fougere, N. L. Brown, and E. Hobart, "Inductive modem for ocean data telemetry," Proceedings Oceans '91, 1165–1170, 1991.

[4] L. E. Freitag, J. S. Merriam, D. E. Frye, and J. A. Catipovic, "A long-term deep-water acoustic telemetry experiment," Proceedings Oceans '91, 254–260, 1991.

| General SSAR requirements | |
|---|---|
| Lifetime | 1 Year |
| Position Accuracy - Buoy | ±20 meters |
| Position Accuracy Array | ±10 meters |
| Timing Accuracy | ±1 msec |
| Power Usage | 1 watt average |
| Array Depth | 500 meters |
| Array Tilt | ±10 degrees |
| Data Telemetry Requirement | 500 bytes reception |
| Data Processing Requirement | 25M Flops |
| Array Motion | $\leq$10 m vertical over 10 seconds |
| | $\leq$3 m horizontal over 10 seconds (after mean velocity removed) |

TABLE VII

Sensors and Systems Specifications Summary

| Item | Specification or Description |
| --- | --- |
| Surface Processor | DOS-based miniature PC with 1 MB memory. 2 MB non-volatile (PCMCIA) disk. Quiescent power drain less than 20 mW. Real-time clock and scheduler. |
| GPS Receiver | Ashtech OEM unit, 12 channels. L1 band, 1 pulse-per-second TTL output, 4 W power. Aircraft style antenna with LNA built into buoy endcap to withstand 40 psi. |
| Argos Transmitter(s) | Supports 2 Selmac SmartCat PTTs with integral data buffering and multiple IDs. Automatically cycles through 16 buffers and up to 4 IDs. Antenna is whip style through-bolted to endcap and requires no additional connector. |
| Surface-Bottom Telemetry | RS-422 (differential plus ground) over 3 conductor E/M cable. Max rate 115 Kbits per second. |
| Battery Power | 15 Volts. 6000 Watt-Hours capacity |
| Status and Housekeeping | Monitors tension between buoy and hose, battery voltage, water temperature at bottom of hose. |
| Subsurface Processor | DOS-based miniature PC with 1 MB memory, 4MB non-volatile (PCMCIA) disk. Quiescent power drain less than 20 mW. Real-time clock and scheduler. |
| Subsurface Co-processor | AT&T DSP32C signal processor running at 50 MHz. 512 KB memory. Power switched. |
| Low frequency Acoustic Array | 6 elements with 10 m spacing, −185 dB re uPa response, 2 wire current-mode interface. Kevlar outer braid with 8000 lbs breaking strength. |
| Low-frequency Analog Processing | 4 pole high-pass and low-pass filters and programmable gain 300 Hz per channel sampling with direct DMA transfer to processor. Optically isolated interface. |
| High-frequency Ultra-short Baseline Acoustic Array. | 4 element encapsulated assay less than 4 inches in diameter |
| High-frequency Analog Processing | 4 channel analog front-end with programmable gain. 100 KHz per channel simultaneous sampling with 12 bit A/D converter directly into DSP coprocessor. |
| Heading sensor | KVH digital compass with 0.5 deg accuracy (max) |
| Internal tilt sensors | 2 orthogonally mounted Lucas Accustar clinometers sampled at 0.2 degrees resolution. |
| Array tilt sensors | Integrated 2-axis tilt sensor mounted in external pressure case at array midpoint. |
| Pressure sensor | 0.1 percent of full scale |
| Temperature sensor | Platinum RTD with 0.01 deg C. accuracy |
| Battery Power | 15 Volts. 4800 Watt-Hours capacity |
| Status and Housekeeping | Monitors battery voltage |

TABLE VIII

Conditions and results of hose flex and tension fatigue tests.

| TEST RESULTS | HOSE SAMPLE #1 | HOSE SAMPLE #2 |
| --- | --- | --- |
| Min and Max Load | 0–1,800 lbs | 0–1,300 lbs |
| Load Cycle Duration | 10 sec | 9.5 sec |
| Elongation* at Maximum Load | 50% | 42.5% |
| Flex Angle | 45° | 25° |
| Duration of Flex Cycle | 3 sec | 2.5 sec |
| Fill Fluid Pressure at Max Tension | 220 psi | 105 psi |
| Load Cycles till Failure | 4,152 | 9,878 |
| Flex Cycles till Failure | 13,781 | 39,546 |
| Failure Type and Localization | Burst failure at end of steel coupling. Reinforcement intact. | ¼" burst at taper of extra reinforcement hose; otherwise intact. |

*Elongation measured in complaint section of test hoses at load cycle 100.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

I claim:

1. A method for collecting data in a large body of water, such as the ocean, comprising the steps of:
   deriving an offset time interval related to source data to be transmitted;
   transmitting an acoustic signal from an acoustic source delayed from a preselected transmission time by the offset time interval;
   determining a measured arrival time at which the acoustic signal is received at a receiver, the travel time of the acoustic signal between the source and the receiver being distinguishably larger than the offset time interval; and
   deriving the source data from the measured arrival time.

2. The method of claim 1, wherein the step of deriving the offset time interval further comprises the step of:
   determining the source data related to a position offset between the acoustic source and a known anchor point.

3. The method of claim 2, wherein the step of deriving the source data further comprises the step of:
   determining a difference between an estimated time of arrival of the acoustic signal at the receiver, based on a transmission at the standard time of transmission, and the measured arrival time.

4. The method of claim 2, wherein the step of determining the offset position further comprises:
   determining a three dimensional position offset.

5. The method of claim 2, further comprising the steps of:
   determining other data from the actual travel time by subtracting the offset interval from the measured arrival time.

6. The method of claim 2, further comprising the steps of:
   determining the offset interval from a difference between an estimated time of arrival of the acoustic signal at the receiver, based on a transmission at the standard time of transmission, and the measured arrival time; and
   determining other data from the actual travel time by subtracting the offset interval from the measured arrival time.

7. The method of claim 2, wherein the step of deriving the other data further comprises the steps of:

supporting the receiver on a freely-drifting buoy; and determining the position of the buoy at the measured arrival time.

8. The method of claim 2, further comprising the steps of:

transitioning the receiver from a low power sleep mode to a signal reception mode at a time related to the estimated time of arrival; and transmitting the source data and the other data in real-time from the receiver to a remote terrestrial station.

9. The method of claim 2, further comprising the step of:

positioning the acoustic source and the receiver within an ocean sound channel.

10. The method of claim 2, wherein the other data is spatially averaged water temperature between the source and the receiver.

11. The method of claim 2, further comprising the steps of:

determining a plurality of measured arrival times at which the acoustic signal is received at a plurality of receivers, the travel time of the acoustic signal between the source and each of the plurality of receivers being distinguishably larger than the offset time interval; and deriving the source data from the measured arrival times.

12. The method of claim 11 further comprising the steps of:

determining a plurality of offset intervals from a difference between an estimated time of arrival of the acoustic signal at each of the plurality of receivers, based on a transmission at the standard time of transmission, and the measured arrival times; and determining other data from the actual travel times by subtracting the offset interval from the measured arrival times.

13. The method of claim 12, further comprising the steps of:

supporting the receiver on a freely-drifting buoy; and
determining the position of the buoy at the measured arrival time.

14. A method for collecting ocean data, comprising the steps of:

determining a three dimensional position offset between a tethered acoustic source and an anchor point for the source;

deriving an offset time interval related to the three dimensional position offset;

transmitting an acoustic signal from an acoustic source, the time of transmission of the acoustic signal being delayed from a preselected transmission time by the offset time interval;

determining a measured arrival time of the acoustic signal at a free-floating buoy, the travel time of the acoustic signal between the tethered acoustic source and the free-floating buoy being distinguishably smaller than the offset time interval; and deriving data from the measured arrival time.

15. The method of claim 14, wherein the step of deriving data from the measured arrival time further comprises the steps of:

determining a difference between an estimated time of arrival of the acoustic signal at the free-floating buoy based on a transmission at the standard time of transmission and the measured arrival time.

16. The method of claim 15, wherein the step of deriving data from the measured arrival time further comprises the step of:

determining actual travel time of the acoustic signal between the source and the buoy by subtracting the offset interval from the measured arrival-time.

17. The method of claim 16, further comprising the steps of:

transitioning the receiver from a low power sleep mode to a signal reception mode at a time related to the estimated time of arrival; and transmitting the data in real-time from the receiver to a remote terrestrial station for collection.

18. The method of claim 16, further comprising the step of:

positioning the-acoustic source and the receiver within an ocean sound channel.

19. The method of claim 16, wherein the data includes spatially averaged water temperature between the source and the receiver and the three dimensional position offset.

20. The method of claim 16, further comprising the steps of:

determining a plurality of measured arrival times at which the acoustic signal is received at a plurality of free-floating buoys, the travel time of the acoustic signal between the source and each of the plurality of free-floating buoys being distinguishably larger than the offset time interval; and deriving the measured arrival times.

* * * * *